US009183276B2

(12) United States Patent
Ogawa et al.

(10) Patent No.: US 9,183,276 B2
(45) Date of Patent: Nov. 10, 2015

(54) ELECTRONIC DEVICE AND METHOD FOR SEARCHING HANDWRITTEN DOCUMENT

(71) Applicant: Kabushiki Kaisha Toshiba, Tokyo (JP)

(72) Inventors: Takehiro Ogawa, Hamura (JP); Atsushi Kakemura, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 268 days.

(21) Appl. No.: 13/966,156

(22) Filed: Aug. 13, 2013

(65) Prior Publication Data
US 2014/0222825 A1 Aug. 7, 2014

Related U.S. Application Data

(63) Continuation of application No. PCT/JP2013/058402, filed on Mar. 22, 2013.

(30) Foreign Application Priority Data

Feb. 4, 2013 (JP) ................................. 2013-019296

(51) Int. Cl.
G06K 9/18 (2006.01)
G06F 17/30 (2006.01)

(52) U.S. Cl.
CPC ............................... *G06F 17/30619* (2013.01)

(58) Field of Classification Search
CPC ................................................ G06F 17/30619
USPC ........................... 382/186, 187; 715/262, 810
See application file for complete search history.

(56) References Cited

U.S. PATENT DOCUMENTS

| 7,929,770 B2 | 4/2011 | Arai |
| 2006/0221357 A1 | 10/2006 | Uzawa |
| 2011/0227881 A1 | 9/2011 | Misawa et al. |
| 2012/0139859 A1* | 6/2012 | Ohira et al. ................... 345/173 |

FOREIGN PATENT DOCUMENTS

| JP | 2006-285612 | 10/2006 |
| JP | 2007-317022 | 12/2007 |
| JP | 2011-197744 | 10/2011 |
| WO | WO 2007/094078 | 8/2007 |
| WO | WO 2014/119012 A1 | 8/2014 |

OTHER PUBLICATIONS

International Search Report for application No. PCT/JP2013/058402, mailed May 28, 2013, in 13 pages.
An English Translation of the International Search Report mailed by Japan Patent Office on May 28, 2013 in the corresponding PCT application No. PCT/JP2013/058402 and Notification (PCT/IB/311)—3 pages.

* cited by examiner

*Primary Examiner* — Mike Rahmjoo
(74) *Attorney, Agent, or Firm* — Knobbe, Martens Olson & Bear LLP

(57) ABSTRACT

According to one embodiment, an electronics device generates first and second index information, the first index information including codes of character strings corresponding to strokes, the second index information including characteristic quantity of strokes. The device executes at least either one of a first search and a second search, according to character string likelihood of first strokes which is a search key. The first search is performed by using the second index information and characteristic quantity of the first strokes. The second search is performed by using the first index information and a code of a character string corresponding to the first strokes.

24 Claims, 19 Drawing Sheets

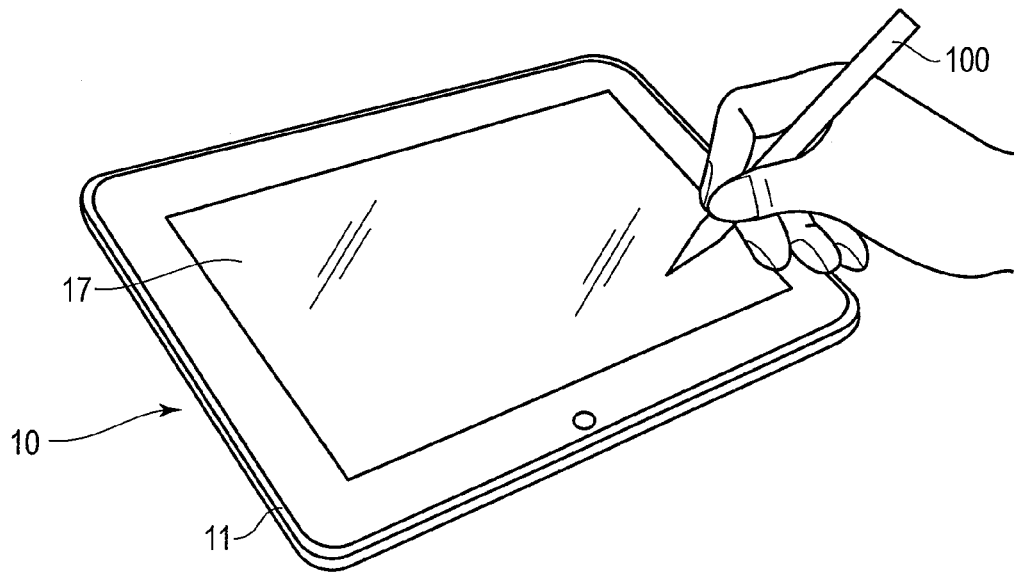
F I G. 1
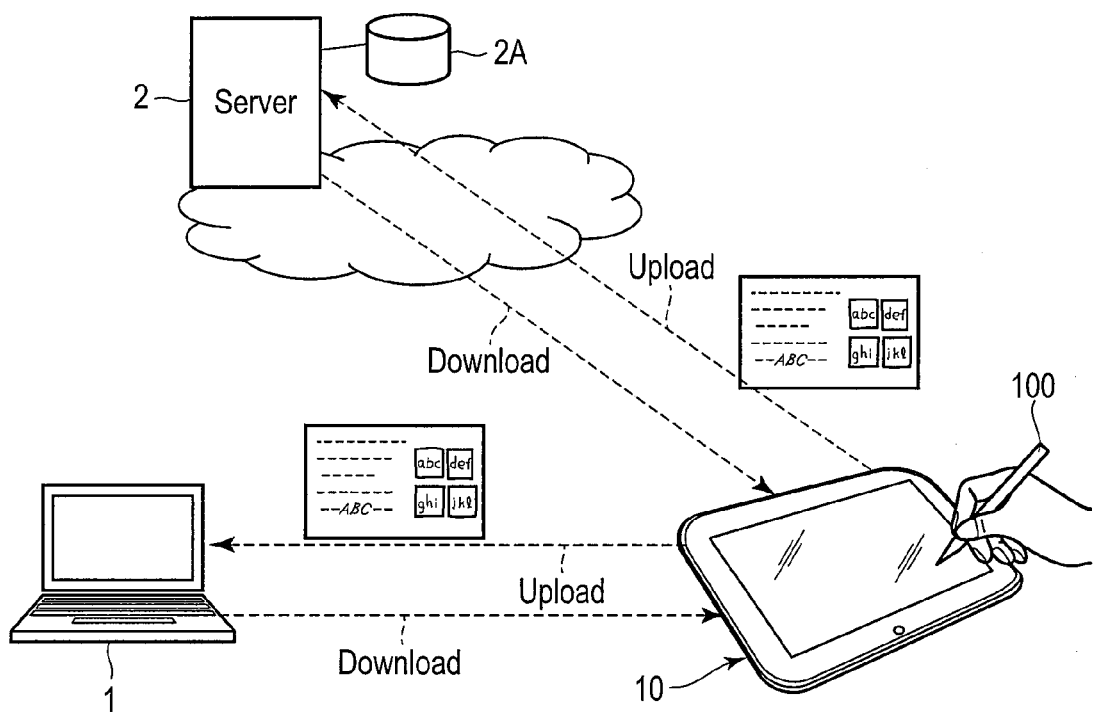
F I G. 2

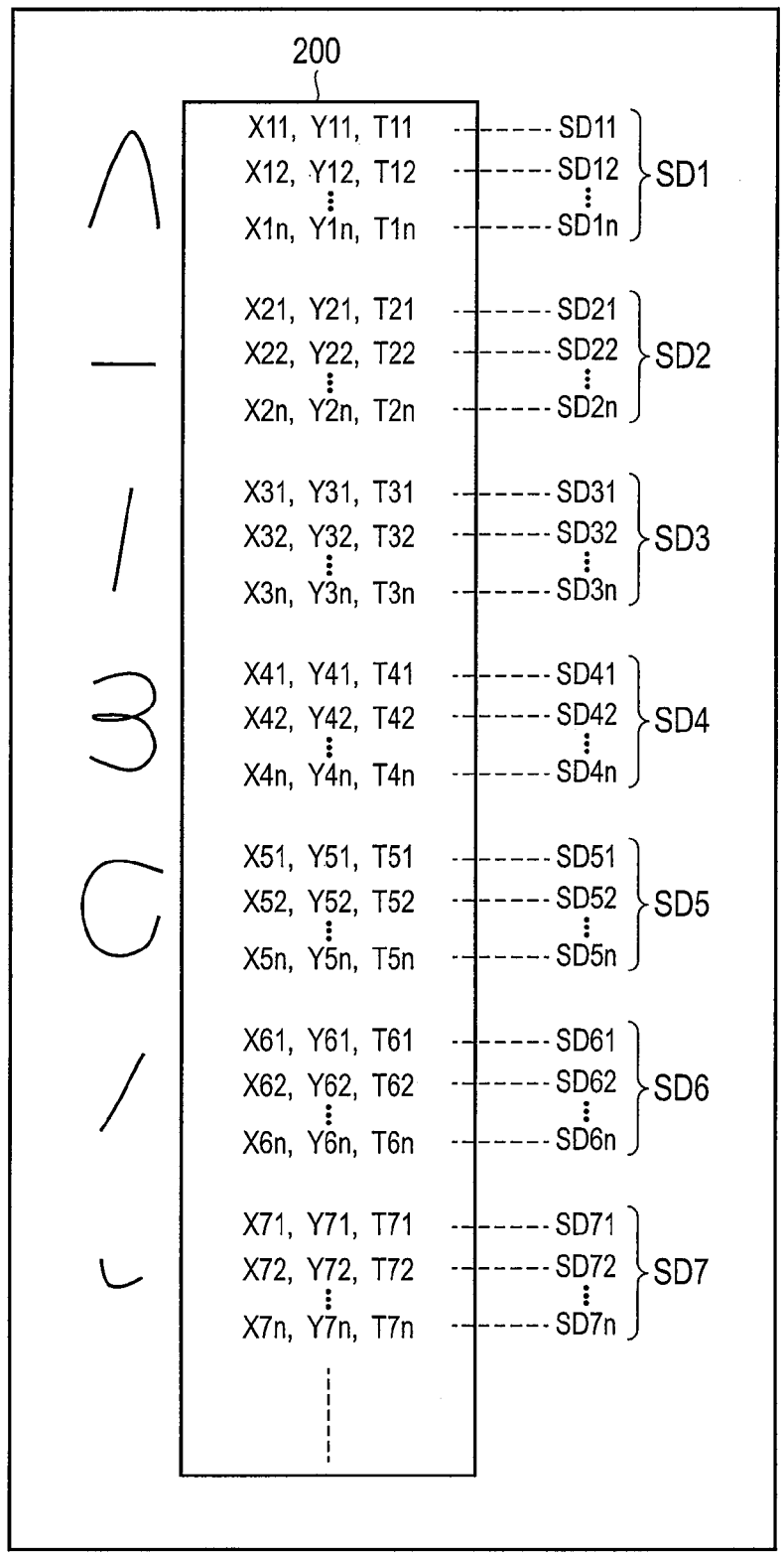
F I G. 4

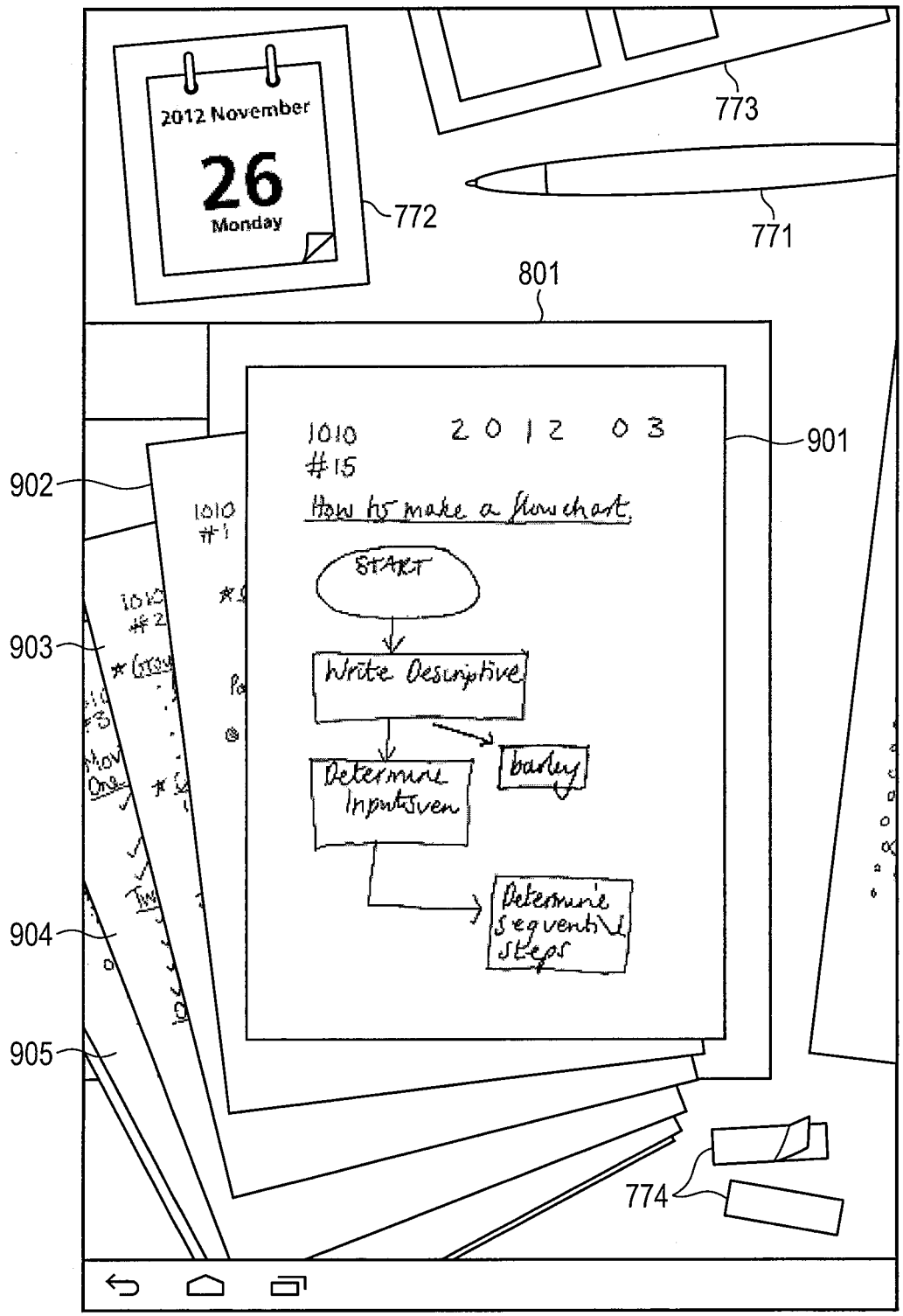
F I G. 7

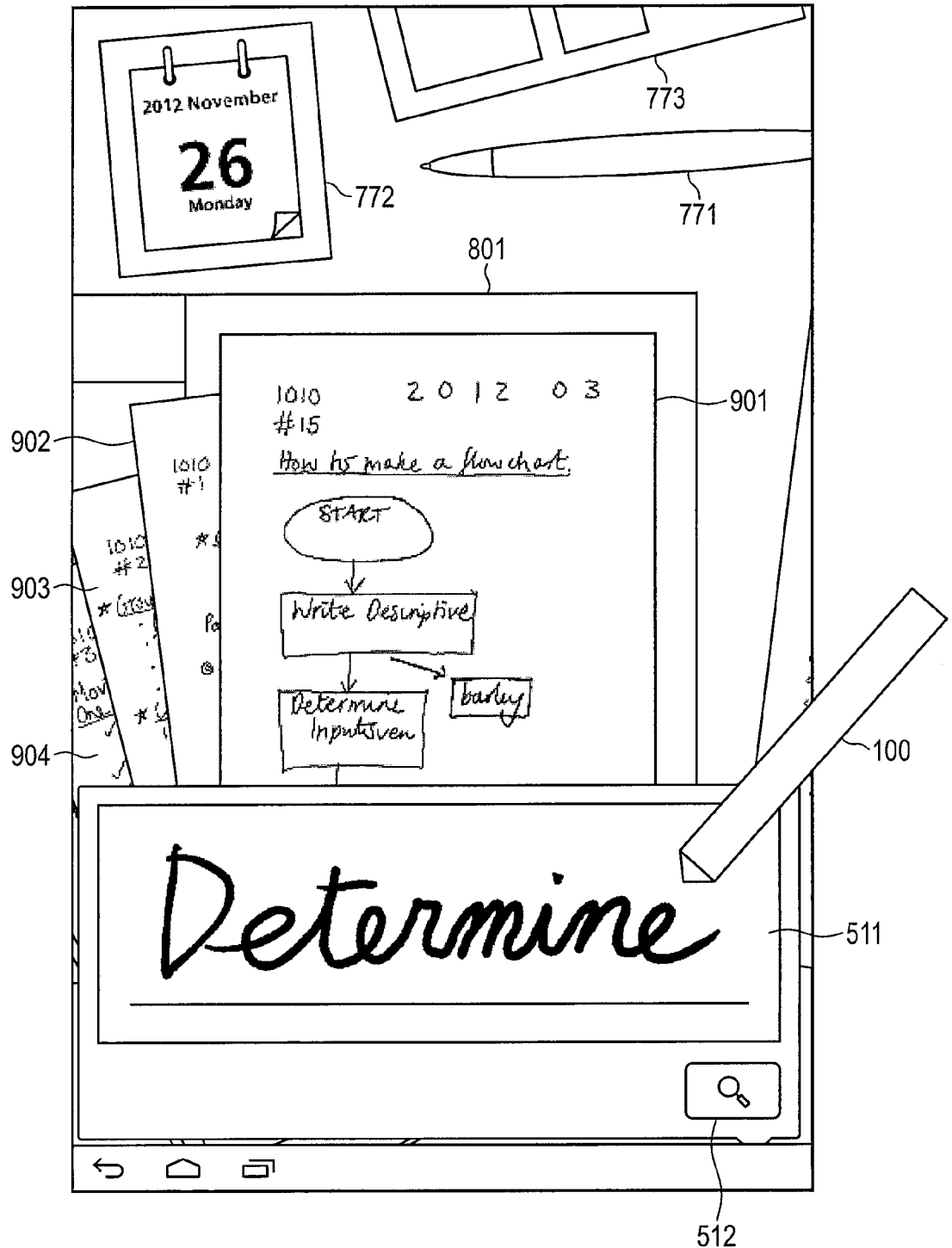
F I G. 9

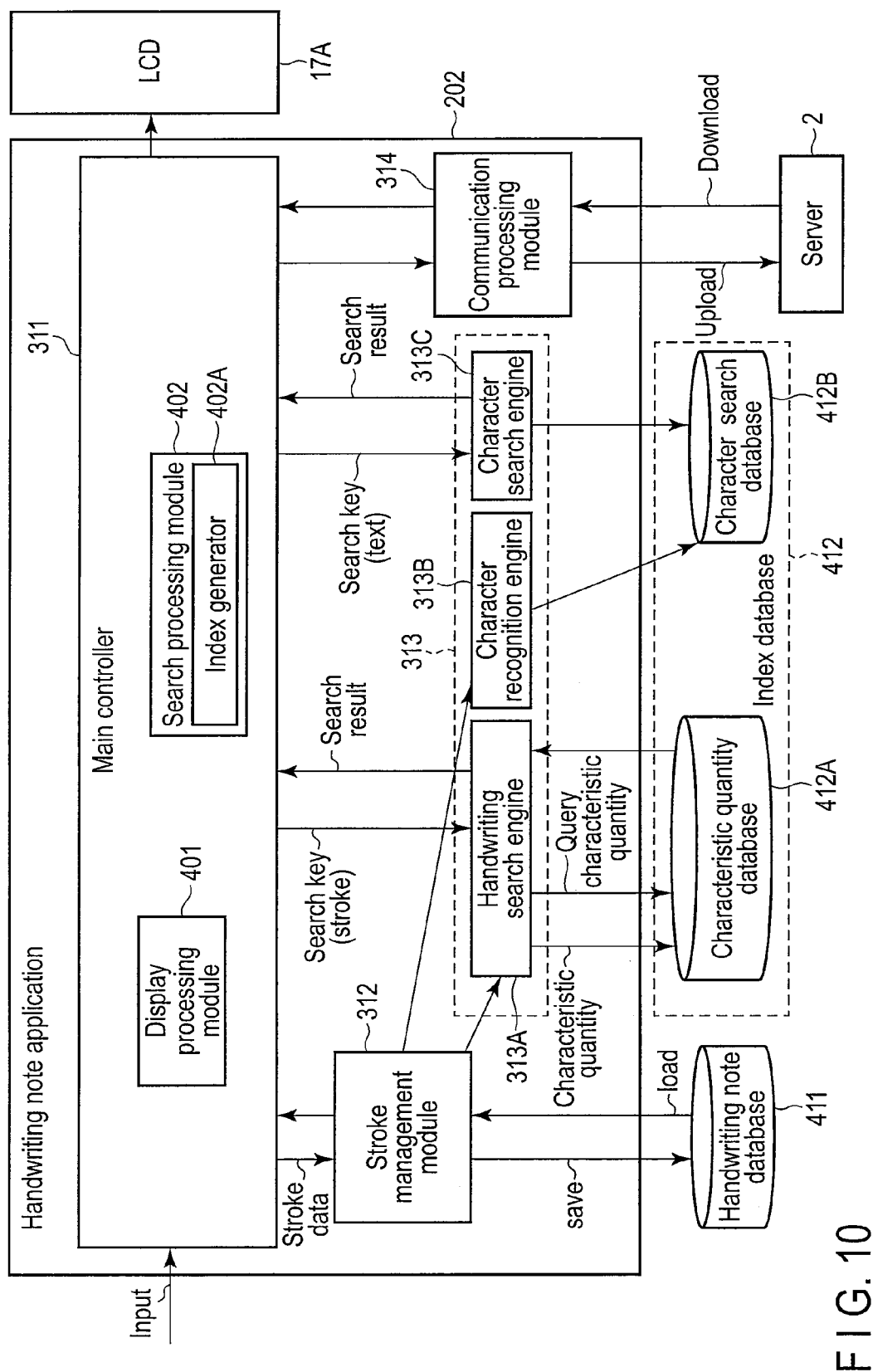
F I G. 10

| Page ID | User ID | Stroke 1 | | Stroke 2 | | ... |
|---|---|---|---|---|---|---|
| | | Stroke ID | Stroke data | Stroke ID | Stroke data | |
| 0001 | 0001 | 0001 | (X11, Y11), (X12, Y12), ... | 0002 | (X21, Y21), (X22, Y22), ... | ... |
| ... | ... | ... | ... | ... | ... | ... |

| Page ID | Stroke ID | Characteristic quantity |
|---|---|---|
| 0001 | 0001 | xxx |
| 0001 | 0002 | yyy |
| ⋮ | ⋮ | ⋮ |

| Page ID | Stroke ID range | Character string |
|---|---|---|
| 0001 | 0001-0008 | XXXX |
| 0011 | 0081-0088 | YYYY |
| ⋮ | ⋮ | ⋮ |

FIG. 13

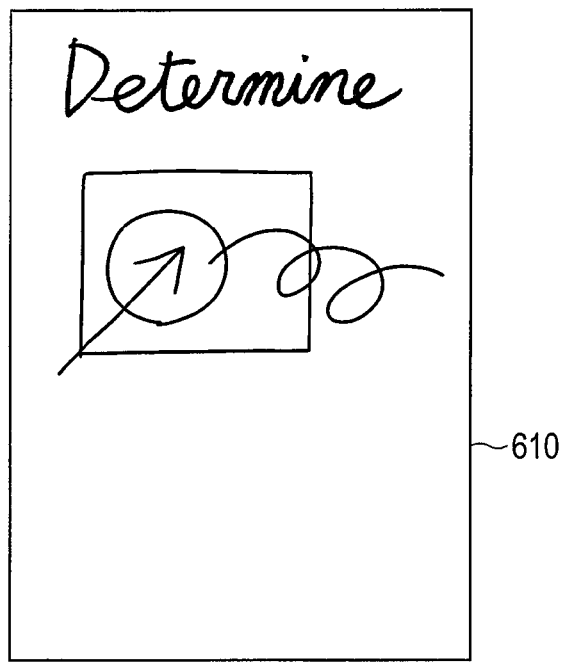
F I G. 15
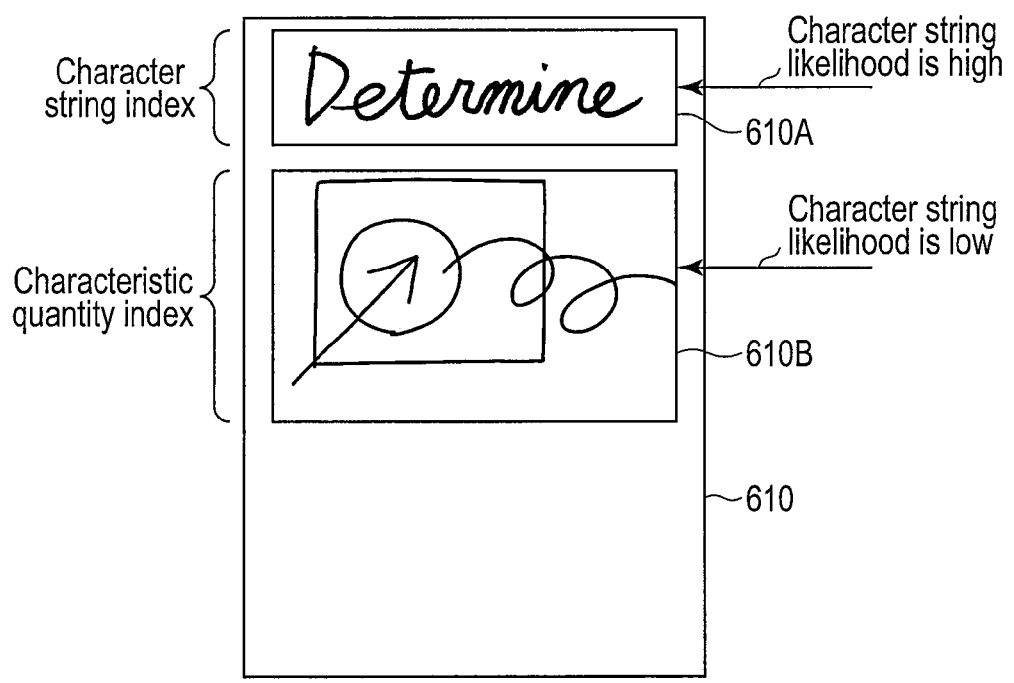
F I G. 16

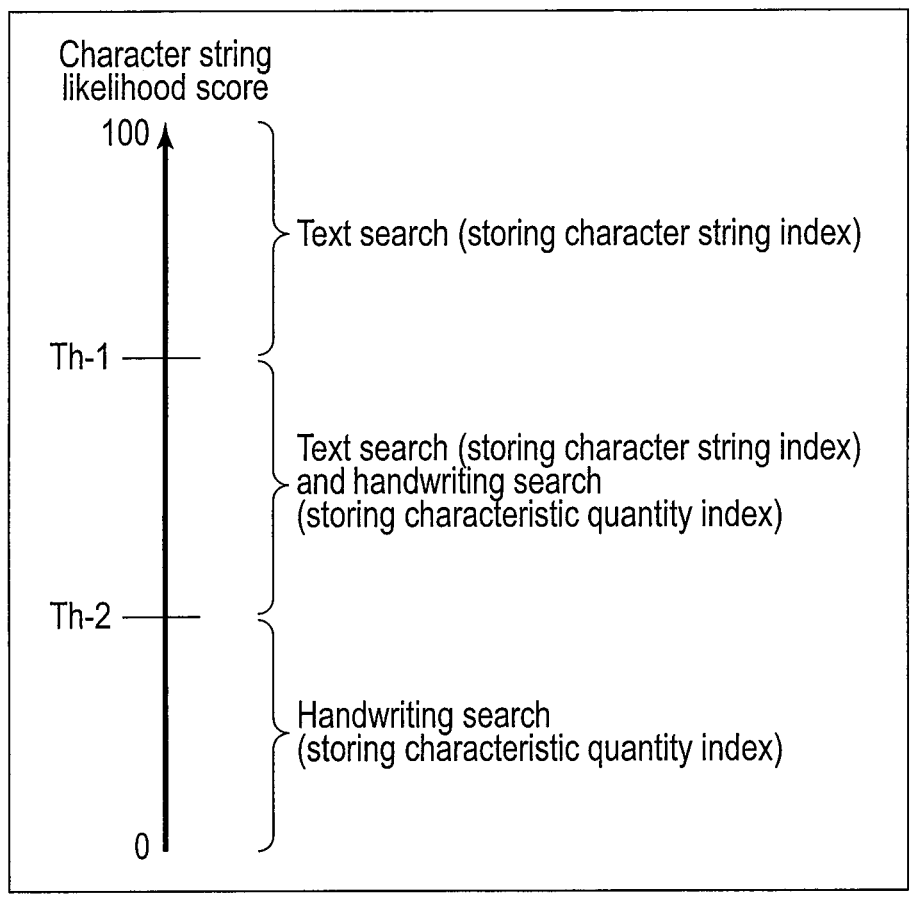
F I G. 20

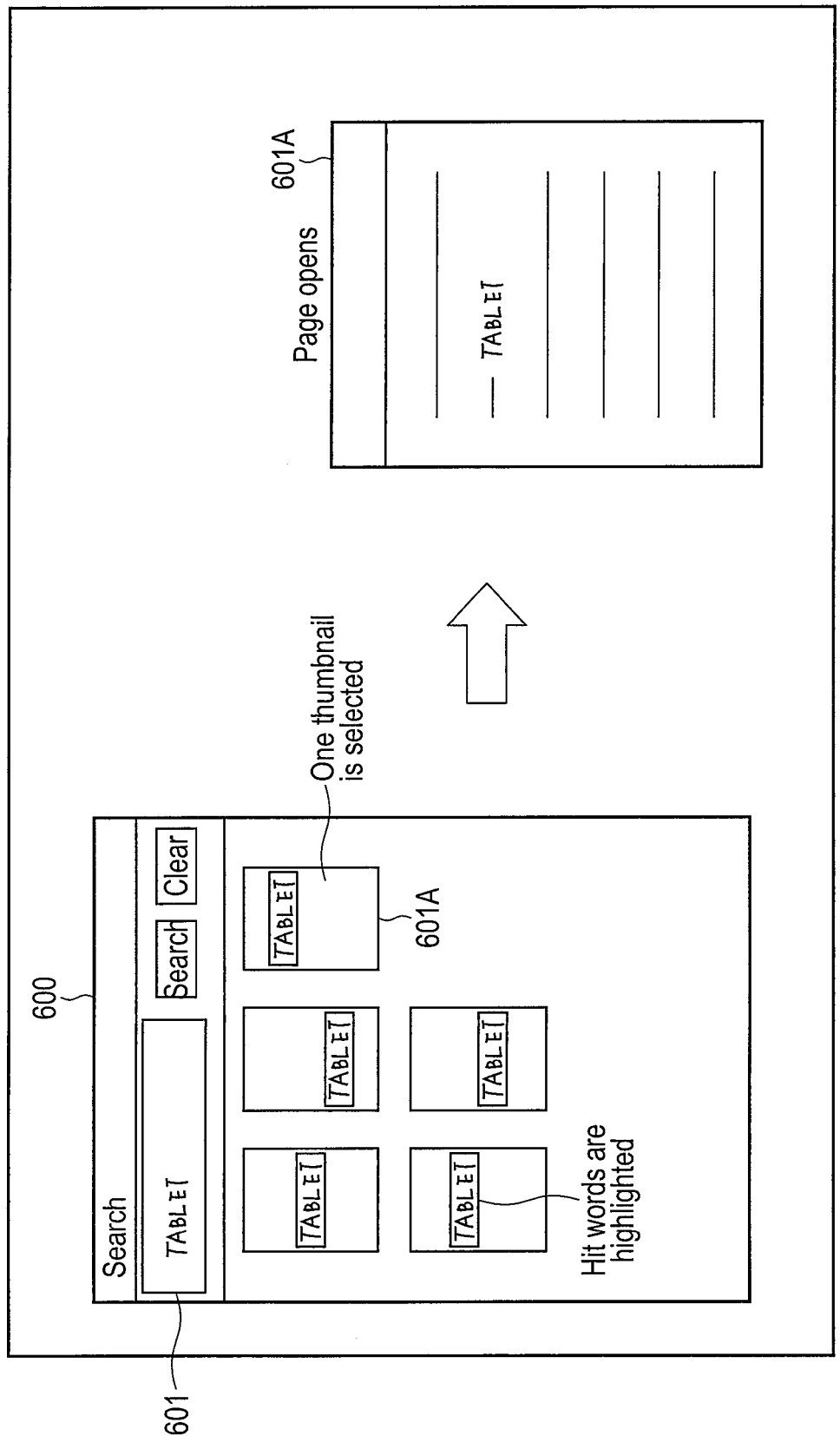
F I G. 21

ELECTRONIC DEVICE AND METHOD FOR SEARCHING HANDWRITTEN DOCUMENT

CROSS-REFERENCE TO RELATED APPLICATIONS

This application is a Continuation application of PCT Application No. PCT/JP2013/058402, filed Mar. 22, 2013 and based upon and claiming the benefit of priority from Japanese Patent Application No. 2013-019296, filed Feb. 4, 2013, the entire contents of all of which are incorporated herein by reference.

FIELD

Embodiments described herein relate generally to a technique of processing a handwritten document.

BACKGROUND

In recent years, various electronic devices such as tablets, PDA, and smart phones have been developed. Most of such kinds of electronic devices include a touch screen display to facilitate an input operation by the user.

The user can give instructions to the electronic device to execute a function related to a menu or object by touching the menu or object displayed on the touch screen display by a finger or the like.

However, most of existing electronic devices with a touch screen display are consumer products pursuing operability for various kinds of media data like images, music and others and are not necessarily suitable for use in business scenes like conferences, business negotiations, and product development. Thus, paper notebooks are still widely used in business scenes.

In recent years, technologies to recognize handwritten characters have also been developed.

However, technologies to search for desired handwritten document efficiently have not been well considered yet.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view showing an appearance of an electronic device according to an embodiment.

FIG. 2 is a diagram showing a linked operation of the electronic device in the embodiment and an external apparatus.

FIG. 4 is a diagram illustrating time-series information stored in a storage medium by the electronic device in the embodiment and corresponding to the handwritten document in FIG. 3.

FIG. 7 is a diagram illustrating a desktop screen displayed by the electronic device in the embodiment.

FIG. 9 is a diagram illustrating a dialog for search key input displayed by the electronic device in the embodiment.

FIG. 10 is a block diagram illustrating a function configuration of a handwriting note application program executed by the electronic device in the embodiment.

FIG. 11 is a diagram illustrating a data structure of a handwritten document managed by the electronic device in the embodiment.

FIG. 12 is a diagram illustrating characteristic quantity index information managed by the electronic device in the embodiment.

FIG. 13 is a diagram illustrating character string index information managed by the electronic device in the embodiment.

FIG. 15 is a diagram illustrating an example of a handwritten document handled by the electronic device in the embodiment.

FIG. 16 is a diagram illustrating a handwritten character string area and another handwritten area both included in the handwritten document shown in FIG. 15.

FIG. 20 is a diagram to describe search methods executed by the electronic device in the embodiment when the character string likelihood of the group of strokes corresponding to the search key is within a middle range.

FIG. 21 is a diagram illustrating an example of a search result screen displayed by the electronic device in the embodiment.

DETAILED DESCRIPTION

Figure 3:
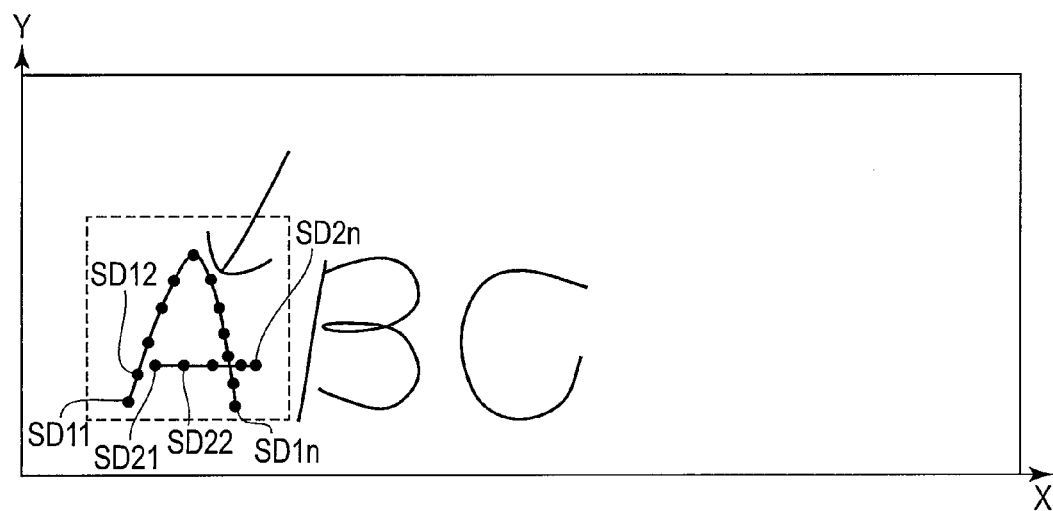
FIG. 3 is a diagram showing an example of a handwritten document which is handwritten on a touch screen display of the electronic device in the embodiment.

Various embodiments will be described hereinafter with reference to the accompanying drawings.

In general, according to one embodiment, an electronic device includes a storage module, a generator, and a processor. The storage module stores a plurality of handwritten documents in a storage medium, the plurality of handwritten documents including a plurality of stroke data corresponding to a plurality of strokes. The generator generates first index information and second index information, the first index information including codes of character strings corresponding to strokes, the second index information including characteristic quantity of strokes. The processor executes at least either one of a first search and a second search, according to a character string likelihood of a plurality of first strokes which is a search key. The first search is performed by using the second index information and characteristic quantity of the first strokes. The second search is performed by using the first index information and a code of a character string corresponding to the first strokes.

FIG. 1 is a perspective view showing an appearance of an electronic device according to an embodiment. The electronic device is, for example, a pen-based portable electronic device which can execute a handwriting input by a pen or a finger. The electronic device is realized as a tablet computer, notebook personal computer, smart phone, PDA or the like. A case in which the electronic device is realized as a tablet computer 10 will be assumed below. The tablet computer 10 is a portable electronic device which is also called a tablet or slate computer and includes, as shown in FIG. 1, a main body 11 and a touch screen display 17. The touch screen display 17 is mounted by being laid on the top surface of the main body 11.

The main body 11 has a thin box-shaped housing. A flat panel display and a sensor configured to detect a contact position of a pen or finger on the screen of the flat panel display are incorporated in the touch screen display 17. The flat panel display may be, for example, liquid crystals display (LCD). For example, an electrical capacitance touch panel or electromagnetic induction type digitizer can be used as a sensor. A case in which two sensors of a digitizer and a touch panel are incorporated in the touch screen display 17 is assumed below.

The touch screen display 17 can detect not only a touch operation on the screen using a finger, but also a touch operation on the screen using a pen 100. The pen 100 may be, for example, an electromagnetic induction pen. The user can perform a handwriting input operation on the touch screen display 17 by using an external object (the pen 100 or a finger). During the handwriting input operation, a locus of movement of the external object (pen 100 or finger) on the screen, that is, a stroke (locus of a handwriting stroke) that is handwritten by the handwriting input operation, is drawn in real time, and thereby a plurality of strokes, which have been input by handwriting, are displayed on the screen. A locus of movement of the external object during a time in which the external object is in contact with the screen corresponds to one stroke. A set of many strokes corresponding to handwritten characters or handwritten objects other than characters (handwritten figures, handwritten tables, etc.) constitutes a handwritten document.

In the present embodiment, the handwritten document is stored in a storage medium not as image data but as time-series information (handwritten document data) indicative of coordinate series of loci of each stroke and an order relation between strokes. Details of the time-series information will be described later with reference to FIG. 4. The time-series information indicates order in which a plurality of strokes were handwritten and includes a plurality of stroke data corresponding to a plurality of strokes. In other words, the time-series information means a set of time-series stroke data corresponding to a plurality of strokes, respectively. Each stroke data corresponds to a certain single stroke, and includes coordinate data series (time-series coordinates) corresponding to points on the locus of this stroke. The order of arrangement of these stroke data corresponds to an order in which strokes were handwritten.

The tablet computer 10 can read any existing time-series information from a storage medium and display the handwritten document corresponding to the time-series information, that is, a plurality of strokes indicated by the time-series information on the screen. The plurality of strokes indicated by the time-series information are also a plurality of strokes input by handwriting.

The tablet computer 10 also has an editing function. This editing function, responding to editing operations by users using an "eraser" tool, a range selection tool, and other various tools, enables any part (handwritten characters, handwritten marks, handwritten figures, handwritten tables, etc.) selected by the range selection tool in a displayed handwritten document to be deleted or moved. Any part selected by the range selection tool in a handwritten document can be further designated as a search key to perform a search in the handwritten document.

In the present embodiment, the handwritten document may be managed as one page or plural pages. In this case, the time-series information (handwritten document data) may be divided in units of an area which falls within one screen, and thereby a piece of time-series information, which falls within one screen, may be stored as one page. Alternatively, the page size may be made variable. In such a case, the page size can be widened to an area larger than the size of one screen and a handwritten document of an area larger than the screen size can be handled as a page. If the whole page cannot be displayed on the display at the same time, the page may be reduced or the display target portion in the page may be moved by vertical and horizontal scrolling.

FIG. 2 shows an example of a linked operation of the tablet computer 10 and an external apparatus. The tablet computer 10 can be linked to the personal computer 1 and a cloud. That is, the tablet computer 10 includes a wireless communication device such as a wireless LAN and can perform wireless communication with the personal computer 1. The tablet computer 10 can also communicate with a server 2 on the Internet. The server 2 may be a server that executes an online storage service or other various cloud computing services.

The personal computer 1 includes a storage device such as a hard disk drive (HDD). The tablet computer 10 can transmit time-series information (handwritten document data) to the personal computer 1 over a network to record the information in the HDD of the personal computer 1 (upload). To ensure secure communication between the tablet computer 10 and the personal computer 1, the personal computer 1 may authenticate the tablet computer 10 when communication is started. In this case, a dialog to prompt the user to input the ID or password may be displayed on the screen of the tablet computer 10. Alternatively, the ID of the tablet computer 10, etc. may automatically be transmitted from the tablet computer 10 to the personal computer 1.

Accordingly, even if the capacity of storage in the tablet computer 10 is insufficient, the tablet computer 10 can handle a large quantity of time-series information or a large-capacity time-series information.

Further, the tablet computer 10 can read (download) any one or more time-series information recorded in the HDD of the personal computer 1 and display strokes indicated by the time-series information on the screen of the display 17 of the tablet computer 10. In this case, a list of thumbnails, which are obtained by reducing the size of pages of the plural time-series information, may be displayed on the screen of the display 17 or a page selected from among these thumbnails may be displayed on the screen of the display 17 in a regular size.

The tablet computer 10 may also communicate with the server 2 on the cloud which provides storage service and the like as described above, not with the personal computer 1. The tablet computer 10 can transmit time-series information (handwritten document data) to the server 2 over a network to store the information in the storage device 2A of the server 2 (upload). Further, the tablet computer 10 can read (download) any one or more time-series information recorded in the storage device 2A of the server 2 and display the locus of each stroke indicated by the time-series information on the screen of the display 17 of the tablet computer 10.

As described above, in the present embodiment, the storage medium in which time-series information is stored may be a storage device in the tablet computer 10, a storage device in the personal computer 1, or the storage device 2A of the server 2.

Next, the relationship between strokes (such as a character, figure, or table) handwritten by a user and time-series information will be described with reference to FIGS. 3 and 4. FIG. 3 shows an example of the handwritten document (handwritten character string) which is handwritten on the touch-screen display 17 by using the pen 100 or the like.

In a handwritten document, there are frequently cases in which another character, figure or the like is input by handwriting on a character, figure or the like once input by handwriting. In FIG. 3, a case in which a handwritten character string "ABC" is input by handwriting in the order of "A", "B", and "C" and then a handwritten arrow is input by handwriting close to the handwritten character "A" is assumed.

The handwritten character "A" is expressed by two strokes (a locus of "∧" shape, a locus of "–" shape) which are handwritten by using the pen 100 or the like, that is, by two loci. The locus of the pen 100 of the first handwritten "∧" shape is sampled in real time, for example, at regular time intervals, and thereby time-series coordinates SD11, SD12, ..., SD1n of the stroke of the "∧" shape are obtained. Similarly, the locus of the pen 100 of the next handwritten "–" shape is sampled in real time, for example, at regular time intervals, and thereby time-series coordinates SD21, SD22, ..., SD2n of the stroke of the "–" shape are obtained.

The handwritten character "B" is represented by two strokes which are handwritten using the pen 100 or the like, that is, two loci. The handwritten character "C" is represented by one stroke which is handwritten using the pen 100 or the like, that is, one locus. The handwritten "arrow" is represented by two strokes which are handwritten using the pen 100 or the like, that is, two loci.

FIG. 4 shows time-series information 200 corresponding to the handwritten document in FIG. 3.

The times series information contains a plurality of stroke data SD1, SD2, ..., SD7. In the time-series information 200, the stroke data SD1, SD2, ..., SD7 is arranged in time series in the order in which the plurality of strokes are handwritten. In the time-series information 200, the first two pieces of stroke data SD1, SD2 indicate two strokes of the handwritten character "A". The third and fourth pieces of stroke data SD3, SD4 indicate two strokes constituting the handwritten character "B". The fifth piece of stroke data SD5 indicates one stroke constituting the handwritten character "C". The sixth and seventh pieces of stroke data SD6, SD7 indicate two strokes constituting the handwritten "arrow".

Each piece of stroke data contains a coordinate data series (times series coordinates) corresponding to one stroke, that is, a plurality of coordinates corresponding to a plurality of points on the locus of one stroke. In each stroke data, the coordinates are arranged in time series in the order in which the stroke is written. Regarding the handwritten character "A", for example, the stroke data SD1 includes coordinate data series (time-series coordinates) corresponding to the points on the locus of the stroke of the handwritten "∧" shape of the handwritten character "A", that is, an n-number of coordinate data SD11, SD12, ..., SD1n. The stroke data SD2 includes coordinate data series corresponding to the points on the locus of the stroke of the handwritten "–" shape of the handwritten character "A", that is, an n-number of coordinate data SD21, SD22, ..., SD2n. Incidentally, the number of pieces of coordinate data may be different from stroke data to stroke data.

Each coordinate data is indicative of an X coordinate and a Y coordinate, which correspond to one point in the associated locus. For example, the coordinate data SD11 is indicative of an X coordinate (X11) and a Y coordinate (Y11) of the starting point of the stroke of the "∧" shape. The coordinate data SD1n is indicative of an X coordinate (X1n) and a Y coordinate (Y1n) of the end point of the stroke of the "∧" shape.

Further, each coordinate data may include time stamp information T corresponding to a time point at which a point corresponding to the coordinates of this coordinate data was handwritten. The time point at which the point was handwritten may be either an absolute time (e.g. year/month/day/hour/minute/second) or a relative time with reference to a certain time point. For example, an absolute time (e.g. year/month/day/hour/minute/second) at which a stroke began to be handwritten may be added as time stamp information to each stroke data, and furthermore a relative time indicative of a difference from the absolute time may be added as time stamp information T to each coordinate data in the stroke data.

In this manner, by using the time-series information in which the time stamp information T is added to each coordinate data, the temporal relation between strokes can be more precisely expressed.

Moreover, information (Z) indicative of a pen stroke pressure may be added to each coordinate data.

The time-series information 200 having a structure as described in FIG. 4 can indicate not only handwriting of each stroke but also temporal relationship between strokes. Thus, even if the tip section of the handwritten "arrow" is written over or close to the handwritten character "A" as shown in FIG. 3, using this time-series information 200 makes it possible to treat the handwritten character "A" and the tip section of the handwritten "arrow" as different characters or figures.

Further, in the present embodiment, as described above, a handwritten document is stored as the time-series information 200 constituted of a set of stroke data in times series, instead of an image or a character recognition result, and thus, handwritten characters can be handled without depending on the language of handwritten characters. Therefore, the structure of the time-series information 200 in the present embodiment can be used in various countries using different languages around the world in common.

Figure 5:
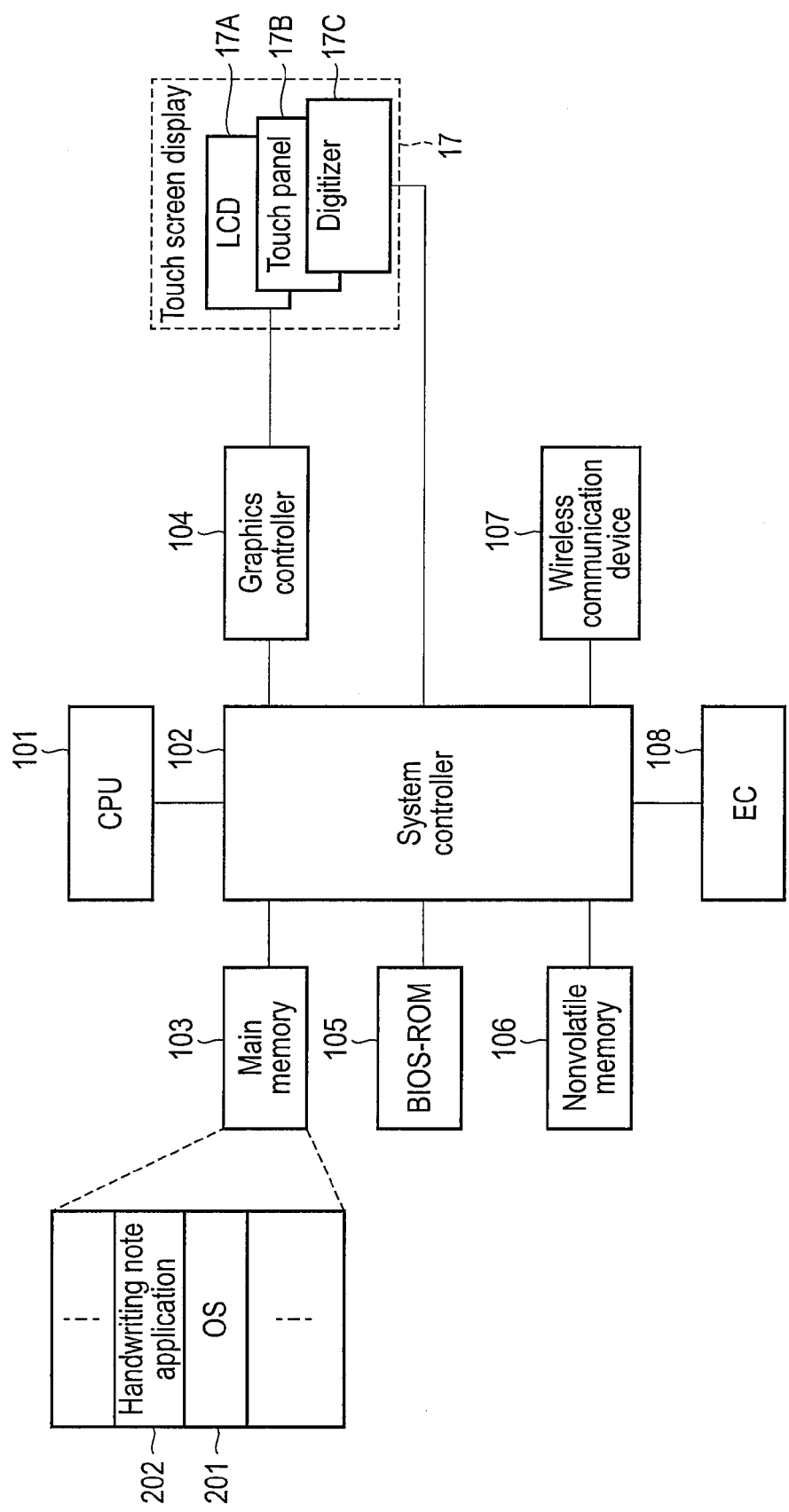
FIG. 5 is a block diagram showing a system configuration of the electronic device in the embodiment.

FIG. 5 is a diagram showing the system configuration of the tablet computer 10.

The tablet computer 10 includes, as shown in FIG. 5, a CPU 101, a system controller 102, a main memory 103, a graphic controller 104, a BIOS-ROM 105, a nonvolatile memory 106, a wireless communication device 107, and an embedded controller (EC) 108.

The CPU 101 is a processor that controls operations of various modules in the tablet computer 10. The CPU 101 executes various kinds of software loaded from the nonvolatile memory 106 as a storage device into the main memory 103. Such software includes an operating system (OS) 201 and various application programs. A handwriting note application program 202 is included in the application programs. The handwriting note application program 202 has a function to create and display handwritten document data described above, a function to edit handwritten document data, and a function to search for handwritten document data that include an intended handwritten part or to search for an intended handwritten part in a certain handwritten document data (handwritten document search function).

Also, the CPU 101 executes a basic input/output system (BIOS) stored in the BIOS-ROM 105. The BIOS is a program to control hardware.

The system controller 102 is a device connecting a local bus of the CPU 101 and various components. The system controller 102 also contains a memory controller that controls access to the main memory 103. The system controller 102 also has a function to perform communication with the graphic controller 104 via a serial bus in the PCI EXPRESS standard or the like.

The graphic controller 104 is a display controller that controls an LCD 17A used as a display monitor of the tablet computer 10. A display signal generated by the graphic controller 104 is sent to the LCD 17A. The LCD 17A displays a screen image based on the display signal. On the LCD 17A, a touch panel 17B and a digitizer 17C are arranged. The touch panel 17B is an electrical capacitance pointing device to do input on the screen of the LCD 17A. The contact position on the screen where a finger comes into contact and movement of the contact position are detected by the touch panel 17B. The digitizer 17C is an electromagnetic induction type pointing device to do input on the screen of the LCD 17A. The contact position on the screen where the pen 100 comes into contact and movement of the contact position are detected by the digitizer 17C.

The wireless communication device 107 is a device configured to perform wireless communication such as wireless LAN, 3G mobile communications or the like. The EC 108 is a one-chip microcomputer containing an embedded controller for power management. The EC 108 has a function to turn on or turn off the tablet computer 10 in accordance with an operation of the power button by the user.

Next, several examples of typical screens presented to a user by the handwriting note application program 202 will be described.

Figure 6:
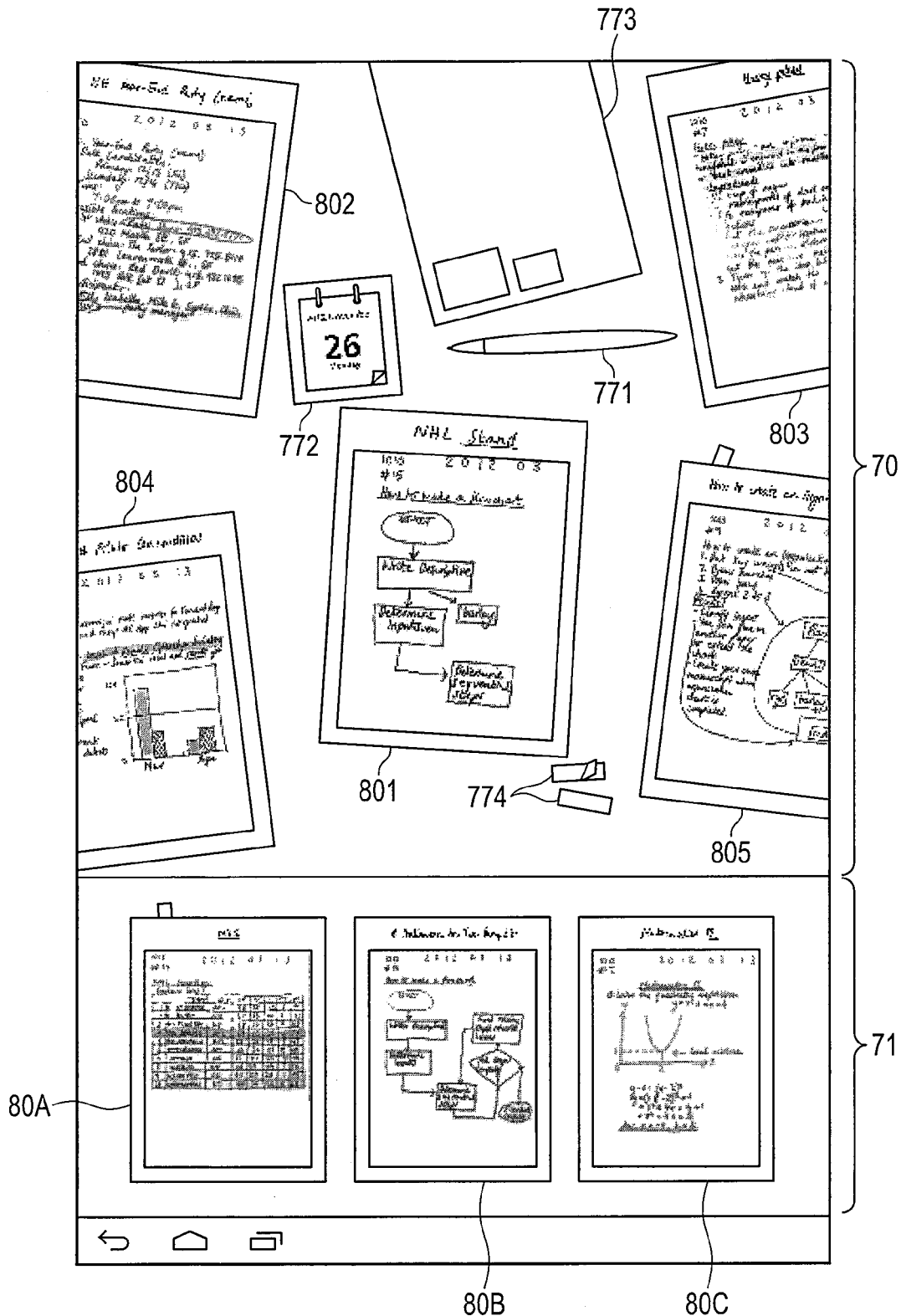
FIG. 6 is a diagram illustrating a desktop and drawer screen displayed by the electronic device in the embodiment.

FIG. 6 illustrates a desktop and drawer screen which is displayed by the handwriting note application program 202. The desktop and drawer screen is a base screen to process a plurality of pieces of handwritten document data. A piece of handwritten document data will be referred to as a handwritten note hereinafter.

The desktop and drawer screen includes a desktop screen area 70 and a drawer screen area 71. The desktop screen area 70 is a temporary area for displaying a plurality of note icons 801 to 805 corresponding to a plurality of in-process handwritten notes. Each of the note icons 801 to 805 displays a thumbnail of some page in the corresponding handwritten note. The desktop screen area 70 further displays a pen icon 771, a calendar icon 772, a scrap note icon 773, and a tag icon 774.

The pen icon 771 is a graphical user interface (GUI) for switching the current screen from the desktop and drawer screen to a note view screen, which will be shown later in FIG. 8. The calendar icon 772 is an icon for displaying the current date. The calendar icon 772 is a GUI for switching the current screen from the desktop and drawer screen to a timeline note screen linked with the current date. The scrap note icon 773 is a GUI for making or browsing scrapped data. Newly scrapped data is registered in a scrapbook. The scrap note icon 773 displays a thumbnail corresponding to each of plural scrapped data registered in the scrapbook. The tag icon 774 is a GUI for attaching sticky notes (tags) on any page in any handwritten note.

The drawer screen area 71 is a display area for viewing storage area for storing all created handwritten notes. The drawer screen area 71 displays note icons 80A, 80B, and 80C corresponding to several handwritten notes among all handwritten notes. Each of the note icons 80A, 80B, and 80C displays the thumbnail of some page in the corresponding handwritten note. The handwriting note application program 202 can detect a gesture (e.g. a swipe gesture) in the drawer screen area 71 performed by a user by use of an external object. Responding to the detection of the gesture (e.g. swipe gesture), the handwriting note application program 202 scrolls the screen image on the drawer screen area 71 to the left or right. A note icon corresponding to any handwritten note can thus be displayed in the drawer screen area 71.

Moreover, the handwriting note application program 202 can detect a gesture (e.g. a tap gesture) on a note icon in the drawer screen area 71 performed by a user by use of an external object. Responding to the detection of a gesture (e.g. tap gesture) on a note icon in the drawer screen area 71, the handwriting note application program 202 moves the note icon to the central part of the desktop screen area 70. The handwriting note application 202 then selects the handwritten note corresponding to the note icon and displays a desktop screen shown in FIG. 7 instead of the desktop and drawer screen. The desktop screen in FIG. 7 is a screen with which any page in the selected handwritten note can be browsed.

Furthermore, the handwriting note application program 202 can detect a gesture (e.g. a tap gesture) in the desktop screen area 70 performed by the user by use of an external object. Responding to the detection of a gesture (e.g. tap gesture) on a note icon located in the central area of the desktop screen area 70, the handwriting note application program 202 selects the handwritten note corresponding to the note icon located in the central area and displays the desktop screen shown in FIG. 7 instead of the desktop and drawer screen.

As described above, the desktop screen in FIG. 7 is a screen which enables viewing of an arbitrary page in the selected handwritten note. A case in which a handwritten note corresponding to the note icon 801 is selected is assumed below. In this case, the handwriting note application program 202 displays a plurality of pages 901, 902, 903, 904 and 905 included in the handwritten note in such a manner that at least a part of each of these pages 901, 902, 903, 904 and 905 is visible and that these pages 901, 902, 903, 904 and 905 overlap.

The desktop screen further displays the pen icon 771, calendar icon 772, scrap note icon 773, and tag icon 774 described above.

The handwriting note application program 202 can detect various gestures in the desktop screen performed by the user. Responding to the detection of a gesture, for example, the handwriting note application program 202 changes the page to be displayed at the top to any page (page forward, page backward). Responding to the detection of a gesture (e.g. a tap gesture) performed on the top page, or responding to the detection of a gesture (e.g. a tap gesture) performed on the pen icon 771, the handwriting note application program 202 selects the top page and displays the note view screen shown in FIG. 8 instead of the desktop screen.

Figure 8:
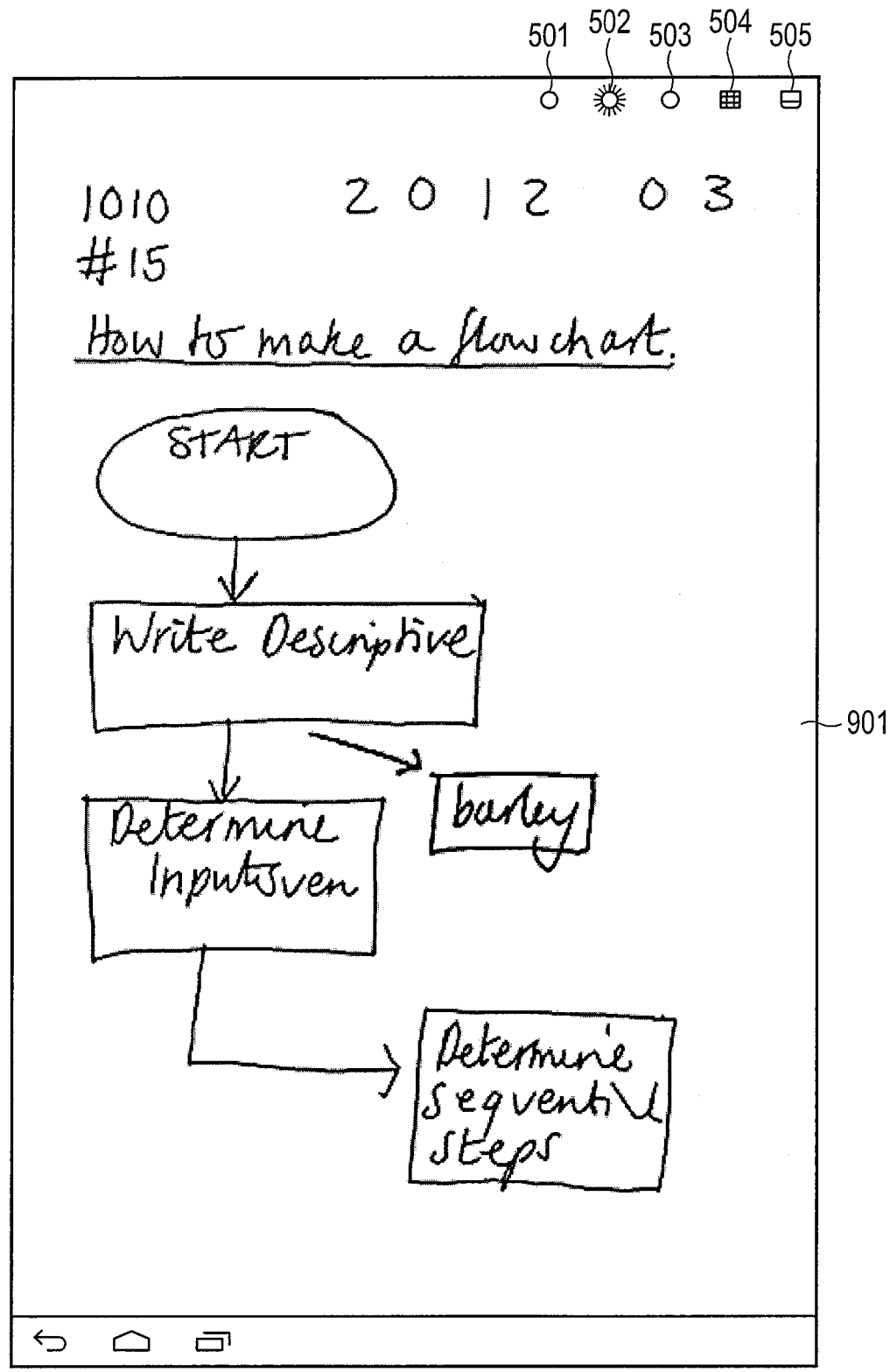
FIG. 8 is a diagram illustrating a note view screen displayed by the electronic device in the embodiment.

The note view screen in FIG. 8 is a screen which enables creation of a new page (handwritten page), and viewing and edit of an existing page. If the page 901 on the desktop screen in FIG. 7 is selected, the note view screen displays the contents of the page 901 as shown in FIG. 8.

The note view screen further displays a black pen button 501, a red pen button 502, a marker pen button 503, a selection button 504, and an eraser button 505.

For example, if a handwriting input operation with use of the pen 100 is performed on the note view screen in the state in which the black pen button 501 is selected by a tap gesture by the user, the handwriting note application program 202 displays a black stroke (locus) on the note view screen in accordance with the movement of the pen 100.

FIG. 9 illustrates an example of a dialog for search key input. For example, responding to the detection of a tap gesture performed on a free space on the desktop screen, the handwriting note application program 202 displays the dialog for search key input which includes a search key input area 511 and a search button 512 on the desktop screen. The search key input area 511 is an input area to write by hand a character string, figure, table, etc. to be the search key. The search button 512 is a button for requesting the execution of search processing. In FIG. 9, an example in which a handwritten character string "Determine" is input into the search key input area 511 as a search key is illustrated. The user can input by handwriting not only a handwritten character string but also a handwritten figure, a handwritten table, etc. in the search key input area 511.

Next, with reference to FIG. 10, a functional configuration of the handwriting note application program 202 will be described.

The handwriting note application program 202 is a WYSIWYG application which can handle handwritten document data and has a main controller 311, a stroke management module 312, a search engine 313, and a communication processing module 314. The main controller 311 performs creation, display, edit, etc. of handwritten documents (handwritten pages) by use of stroke data input through the touch screen display 17.

The main controller 311 includes a display processing module 401 and a search processing module 402. The display processing module 401 displays a plurality of strokes input by handwriting on a screen of the LCD 17A in the touch screen display 17. For example, if the note view screen shown in FIG. 8 is displayed, the display processing module 401 draws strokes on the note view screen based on a series of coordinates input via the digitizer 17C. The search processing module 402 executes the handwritten document search described above in coordination with the search engine 313. The search processing module 402 has an index generator 402A. The index generator 402A generates index information for searching each handwritten page in coordination with the search engine 313.

The main controller 311 receives a coordinate series corresponding to loci of the movement of the pen 100 from the touch screen display 17 (e.g. digitizer 17C). The display processing module 401, based on the coordinates series, displays each stroke corresponding to a handwritten character, a handwritten figure, and the like input by handwriting on the screen of the LCD 17A in the touch screen display 17. The locus of the pen 100 while the pen 100 is in contact with the screen, that is, the locus of each stroke, is drawn on the screen of the LCD 17A by the display processing module 401. The main controller 311 sends the stroke management module 312 the above-described coordinate series received from the touch screen display 17.

The stroke management module 312 functions as a storage module configured to store into a handwritten note database 411 a handwritten document (a handwritten page) including a plurality of stroke data corresponding to a plurality of strokes. More precisely, the stroke management module 312, based on the above-described coordinate series received from the touch screen display 17, generates the above-described time-series information having the structure described in FIG. 4 and stores the time-series information into the handwritten note database 411 as a page of a handwritten note. The handwritten note database 411 is a storage area in the storage medium. Further, the stroke management module 312 reads out any handwritten note page from the handwritten note database 411. Time-series information corresponding to the read-out page is sent to the display processing module 401. The display processing module 401 analyzes the time-series information and, based on the analysis result, displays each stroke indicated by the time-series information (each stroke input by handwriting) on the screen.

As described above, the handwritten document search is executed by the search processing module 402 and the search engine 313. The search processing module 402 is able to search the handwritten note database 411 by selectively using two types of search method, a handwriting search and a character string search (text search).

The search engine 313 has a handwriting search engine 313A, a character recognition engine 313B, and a character string search engine (character search engine) 313C. The handwriting search engine 313A executes the above-described handwriting search under the control of the search processing module 402. The handwriting search is a search method for searching for a handwritten document that includes a handwritten part having a characteristic quantity (handwriting characteristic) resembling the characteristic quantity (handwriting characteristic) of a plurality of strokes which is a search key.

Any information that is able to describe the characteristics of each of a plurality of strokes can be used for the characteristic quantity (handwriting characteristic) of the strokes. For example, for the characteristic quantity (handwriting characteristic) of a plurality of strokes, characteristic quantity data that show the shape, drawing direction, inclination, and the like of each stroke can be used. When the handwriting search is executed, the handwriting search engine 313A receives a plurality of strokes that is a search key from the search processing module 402. The handwriting search engine 313A then searches for one or more handwritten documents (handwritten pages) that include an area (handwritten part) corresponding to the above-described search key by use of characteristic quantity index information for searching a plurality of areas in a plurality of handwritten documents (a plurality of handwritten pages) and the characteristic quantity (query characteristic quantity) of a plurality of strokes that is the search key. The characteristic quantity index information includes the characteristic quantity of strokes in each area.

More precisely, the handwriting search engine 313A identifies a characteristic quantity index information section that has a characteristic quantity resembling the query characteristic quantity from among the characteristic quantity index information in the characteristic quantity database 412A and returns the characteristic quantity index information section to the main controller 311. In this case, a characteristic quantity index information section that has a degree of similarity to the query characteristic quantity equal to or greater than a reference value is obtained from the characteristic quantity index information. DP (Dynamic Programming) matching may be used for the method to compute the degree of similarity.

The search processing module 402 in the main controller 311 searches for one or more handwritten pages that include handwritten parts having characteristic quantities resembling the above-described query characteristic quantity, based on the characteristic quantity index information section received from the handwriting search engine 313A.

The handwriting search engine 313A is also configured to execute the processing to generate the above-described index information corresponding to each handwritten page under the control of the index generator 402A. Generation of the characteristic quantity index information of a handwritten page may be executed when the handwritten page is stored. In this case, a plurality of stroke data corresponding to the handwritten page are stored in the handwritten note database 411 and sent to the handwriting search engine 313A. The handwriting search engine 313A analyzes the stroke data of each area (each handwritten part) in the handwritten page and generates the above-described characteristic quantity index information. The generated characteristic quantity index information is stored in the characteristic quantity database 412A, with being linked to the corresponding handwritten page in the handwritten note database 411.

The character string search is a search method (text search) for searching for a handwritten document which includes a character string corresponding to a plurality of strokes which is a search key. In the character string search (text search), the character string search engine 313C receives code information (text) of a character string corresponding to a plurality of strokes which is a search key (search word) from the search processing module 402. The code information of a character string corresponding to a plurality of strokes can be obtained through character recognition of the plurality of strokes by the character recognition engine 313B. The character string search engine 313B searches for a handwritten page that includes the handwritten part corresponding to the above-described search key (search word) by using character string index information for searching a plurality of areas in a plurality of handwritten documents (a plurality of handwritten pages) and code information (text) of the character string corresponding to a plurality of strokes which is a search key. The character string index information includes the code information of a character string corresponding to strokes included in each area in the handwritten page. The code information can be generated, for example, through applying character recognition to strokes in each handwritten character string.

In the character string search processing, the character string search engine 313C identifies a character string index information section including the above-described search words from the character string index information in the character string search database 412B. The character string search engine 313C then returns the character string index information section to the main controller 311. The search processing module 402 in the main controller 311 searches for one or more handwritten pages that include handwritten parts corresponding to the above-described search words, based on the character string index information section received from the character string search engine 313C.

As described above, a handwritten page may include not only handwritten character strings but also handwritten figures, handwritten tables, handwritten marks and the like. The above-described handwriting search can search for not only handwritten character strings but also non-character handwritten objects such as handwritten figures, handwritten tables, handwritten marks and the like. The handwriting search is therefore useful for a handwritten page search.

There is, however, a possibility that a non-character handwritten figure is incorrectly searched when, for example, a handwritten character string is input as a search key if the handwriting search is always used regardless of whether a plurality of strokes input as a search key are handwritten characters or handwritten objects other than handwritten characters. For example, in the case that a handwritten character string including handwritten characters such as "o", "q", or "d" is input as a search key, there is a possibility that a round handwritten figure, a quadrangular handwritten figure, or the like is incorrectly retrieved in the search.

Moreover, handwriting characteristics differ with respect to each user. Further, even if the same user writes the same character by hand, the characteristic of a character handwritten in a hurry may be different from the characteristic of a character handwritten carefully. Thus, if the handwriting search is always applied regardless of whether a plurality of strokes input as a search key are handwritten characters or other handwritten objects other than handwritten characters, handwritten pages written by other persons or handwritten pages written carelessly by the user in the past may not be searched correctly.

In the embodiment, both handwriting search and character string search (text search) are employed in combination for handwritten document search. That is, the search processing module 402 executes at least one of the handwriting search and the character string search (text search) according to a character string likelihood of a plurality of strokes which is a search key. The character string likelihood of a plurality of strokes is a score indicating how much the strokes look like a character string. In this embodiment, the whole of a plurality of strokes handwritten as a search key are treated as a handwritten block, and a character string likelihood of the handwritten block is computed.

The character string likelihood may be represented by a score of 0 to 100. The character string likelihood 100 represents the maximum likelihood and the character string likelihood 0 represents the minimum likelihood. For the method of computing the character string likelihood of a plurality of strokes as a search key, any method with which a degree of approximation of these strokes to a character string as a whole is measurable can be used. For example, the characteristic quantity of these strokes is extracted first and, based on the characteristic quantity, the character string likelihood of these strokes can be computed. The character string likelihood can also be computed based on the number of strokes in a handwritten block because a stroke density (the number of strokes per handwritten block) of a handwritten figure, a handwritten table, or the like is often low compared with the stroke density of a handwritten character. The character string likelihood can also be computed as a degree of approximation to the character string obtained through character recognition of a plurality of strokes input as a search key.

If the character string likelihood of the plurality of strokes as a search key is relatively high, i.e. there is a high possibility that the plurality of strokes is a character string, the search processing module 402 executes the character string search (text search). If the character string likelihood of the plurality of strokes as a search key is relatively low, i.e. there is a low possibility that the plurality of strokes is a character string, the search processing module 402 executes the handwriting search.

In the embodiment, as described above, a plurality of strokes which is a search key is treated as a handwritten block and the search method to be executed is automatically determined according to the character string likelihood which indicates the degree of approximation of the handwritten block to a character string. Accordingly, because the character string search is executed if the search key resembles a character string and the handwriting search is executed if the search key does not resemble any character string, precision of the handwritten documents search can be increased.

Though the above-described character string index information and the above-described characteristic quantity index information may both be generated for all areas in each handwritten page, either of the above-described character string index information or the above-described characteristic quantity index information may selectively be generated depending on whether each area in each handwritten page is a character string area or non-character string area.

In this case, in the character string search (text search), the search processing module 402 searches each character string area in each handwritten page, not all areas in each handwritten page. A character string area is the area that has a high character string likelihood. By this feature, an inconvenience that, despite the search key strokes being a handwritten character string, a handwritten figure other than a character string is incorrectly retrieved can be prevented effectively.

In the handwriting search, meanwhile, the search processing module 402 searches each non-character string area in each handwritten page, not all areas in each handwritten page. A non-character string area is the area that has a low character string likelihood. By this feature, an inconvenience that, despite the search key strokes being a handwritten figure, a handwritten character string is incorrectly retrieved can be prevented effectively.

In the embodiment, as described above, the search method to be used is automatically selected according to the character string likelihood of a plurality of strokes which is a search key and areas to be searched in each handwritten page are determined according to the character string likelihood of the plurality of strokes which is the search key. In order to accomplish this scheme, the index generator 402A in the search processing module 402 generates character string index information for searching a plurality of character string areas in a plurality of handwritten pages and characteristic quantity index information for searching a plurality of non-character string areas in the plurality of handwritten pages. The character string index information includes code information of character strings corresponding to strokes included in each character string area. The characteristic quantity index information indicates the characteristic quantity of strokes in each non-character string area.

More precisely, the index generator 402A selectively generates either the above-described character string index information or the above-described characteristic quantity index information for every area in a handwritten page according to the character string likelihood of the area.

If the character string likelihood of the area for which an index is to be generated is relatively high, the index generator 402A generates character string index information for searching the area in coordination with the character recognition engine 313B in the search engine 313. The character string index information includes the code information of a character string corresponding to a group of strokes in the area. The code information of the character string can be obtained by performing character recognition of the group of strokes by the character recognition engine 313B. The generated character string index information is stored in the character string search database 412B in the index database 412.

If the character string likelihood of the area for which an index is to be generated is low, the index generator 402A generates characteristic quantity index information for searching the area in coordination with the handwriting search engine 313A in the search engine 313. The characteristic quantity index information is the information that indicates the characteristic quantity (handwriting characteristic) of a group of strokes in the area. The generated characteristic quantity index information is stored in a characteristic quantity database 412A in the index database 412.

The main controller 311 is further able to communicate with the server 2 via the communication processing module 314. The communication processing module 314 works as not only a transmitter which transmits (uploaded) any handwritten page data to the server 2 but also a receiver which receives any handwritten page data from the server 2.

FIG. 11 illustrates a configuration of a handwritten page data management table which is stored in the handwritten note database 441. The handwritten page data management table contains a plurality of entries corresponding to a plurality of handwritten pages. Each entry contains, for example, the page ID, user ID, stroke ID, and stroke data. In an entry corresponding to some handwritten page data, "Page ID" indicates given identification information of this handwritten page data. "User ID" indicates given identification information of the user who has created this handwritten page data. "Stroke ID" indicates given identification information of a stroke which is handwritten on this handwritten page data. "Stroke data" indicates the coordinate data series (times series coordinates) corresponding to a stroke which is handwritten on the handwritten page data.

FIG. 12 illustrates an exemplary configuration of a characteristic quantity index information management table which is stored in the characteristic quantity database 412A. The characteristics quantity index information management table has a plurality of entries corresponding to a plurality of strokes. Each entry contains, for example, the page ID, user ID, and characteristic quantity. In an entry corresponding to some stroke, "Page ID" indicates given identification information of the handwritten document on which this stroke is handwritten. "Stroke ID" indicates given identification information of this stroke. "Characteristic quantity" indicates a characteristic quantity (handwriting characteristics) calculated by analyzing this stroke. As described above, characteristic quantity data representing the shapes or the like of each stroke can be used for the handwriting characteristics.

Though an example in which a characteristics quantity is managed for each of strokes is shown above, it is also possible that a handwritten object (handwritten block) such as a handwritten figure, a handwritten table, and a handwritten symbol is defined as a management unit and the characteristic quantity of each handwritten object is used for the management. For characteristic quantity of a handwritten object, any characteristic quantity which is able to indicate a characteristic of the handwritten object such as shape can be used. Moreover, characteristic quantity of a handwritten object may include other information such as an order by which a plurality of strokes composing the handwritten object are written.

The characteristic quantity index information management table may include location information that indicates the position in the page at which the handwritten object is placed.

FIG. 13 illustrates an exemplary configuration of the character string index information management table which is stored in the character string search database 412B. The character string index information management table includes a plurality of entries corresponding to a plurality of areas (a plurality of character string blocks) that have high character string likelihoods. Each entry includes, for example, "page ID", "stroke ID range", and "character string". In an entry corresponding to some character string block, "Page ID" indicates identification information of the handwritten page on which this character string block is handwritten. "Stroke ID range" indicates the range of identification information of the stroke group in this character string block. "Character string" indicates code information (a group of character codes) for this character string block. In the code information (character codes group) of a character string block, a plurality of code information each of which corresponds to one of a plurality of character string candidates of the character string block may be registered. The character string index information management table may include location information which shows the location in the page at which each character string block is placed.

Figure 14:
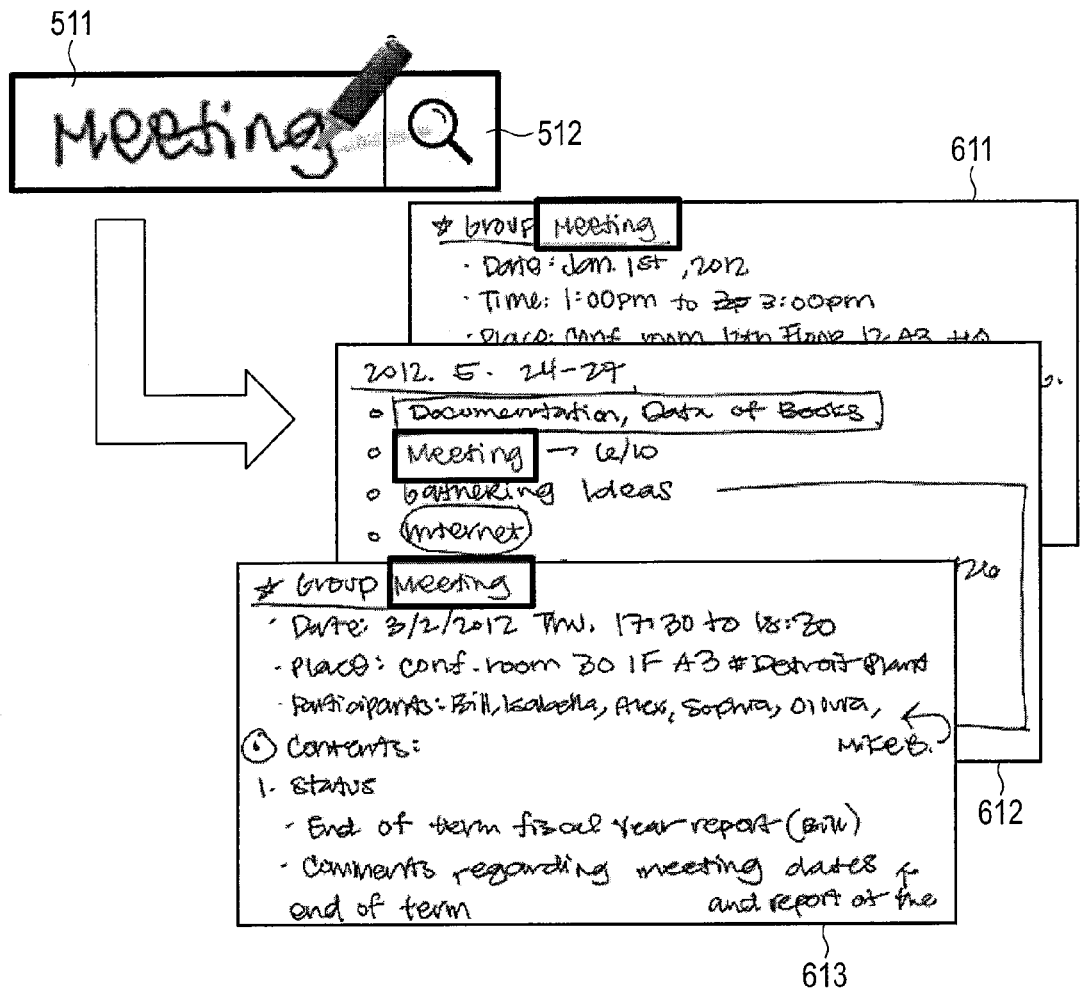
FIG. 14 is a diagram to describe a summary of character string search executed by the electronic device in the embodiment.

FIG. 14 illustrates a summary of the handwritten document search. A case in which a plurality of strokes corresponding to the handwritten character string "Meeting" is handwritten with the pen 100 in the search key input area 511 is assumed in the following description. The plurality of strokes is a stroke group which has a high character string likelihood.

The search processing module 402 can accordingly select the above-described character string search as the suitable search method. The search processing module 402 applies character recognition to the handwritten character string "Meeting" using the character recognition engine 313B and obtains code information (character string "Meeting") corresponding to the handwritten character string "Meeting". The search processing module 402 searches for handwritten pages which include a handwritten part (handwritten character string) corresponding to the character string "Meeting" with reference to the character string index information management table in the character string search database 412B. A case in which handwritten pages 611, 612, and 613 include a handwritten character string corresponding to the character string "Meeting" is assumed. In this case, the handwriting note application program 202 displays a thumbnail for each of the handwritten pages 611, 612, and 613 on the screen. The handwriting note application program 202 further highlights hit words (handwritten character string "Meeting") in the handwritten page 611, 612, and 613.

FIG. 15 shows a handwritten page 610 which includes a handwritten character string and handwritten objects other than handwritten character strings. The handwritten page 610 includes an area with high character string likelihood (character string block) 610A and an area with low character string likelihood (non-character string block) 610B as illustrated in FIG. 16. The handwriting note application program 202 generates the above-described character string index information as the index information to search a group of strokes in the area 610A and registers the character string index information to the character string index information management table in the character string search database 412B. The handwriting note application program 202 also generates the above-described characteristic quantity index information as the index information to search a group of strokes in the area 610B and registers the characteristic quantity index information to the characteristic quantity index information management table in the characteristic quantity database 412A.

In this embodiment, as described above, characteristic quantity index information and character string index information is selectively used depending on the character string likelihood of each area in a handwritten page.

If the character string search is executed (i.e. a case in which the character string likelihood of a search key is high), the area 610A is thus searched but the area 610B is not searched. This is because the character string index information for the area 610A has been registered in the character string search database 412B but the character string index information for the area 610B does not exist in the character string search database 412B.

If the character string index information for the area 610B is also generated, not only the area 610A but also the area 610B becomes the target of the character string search (text search). In this case, there is a possibility that, despite search key strokes being a handwritten character string, a handwritten figure other than a character string is incorrectly retrieved in the search. This is because, if the character string index information for the area 610B is generated with character recognition, handwritten figures in the area 610B may be converted to several incorrect character codes in some cases.

In this embodiment, areas with high character string likelihood (character string areas) in each handwritten page can be chosen as targets of search in the character string search (text search).

In the embodiment, when the handwriting search is executed (i.e. the character string likelihood of the search key is low), the area 610A in the handwritten page 610 in FIG. 16 is not searched and the area 610B in the handwritten page 610 is searched. This is because the characteristic quantity index information for the area 610B has been registered in the characteristic quantity database 412A but the characteristic quantity index information for the area 610A does not exist in the characteristic quantity database 412A.

If characteristic quantity index information for the area 610A is generated, not only the area 610B but also the area 610A becomes the target of search in the handwriting search. In this case, there is a possibility that, despite search key strokes being a handwritten figure, a handwritten character is incorrectly recognized.

In this embodiment, areas with low character string likelihood (areas of a handwritten object other than a handwritten character string) in each handwritten page can be chosen as the target of the handwriting search.

Figure 17:
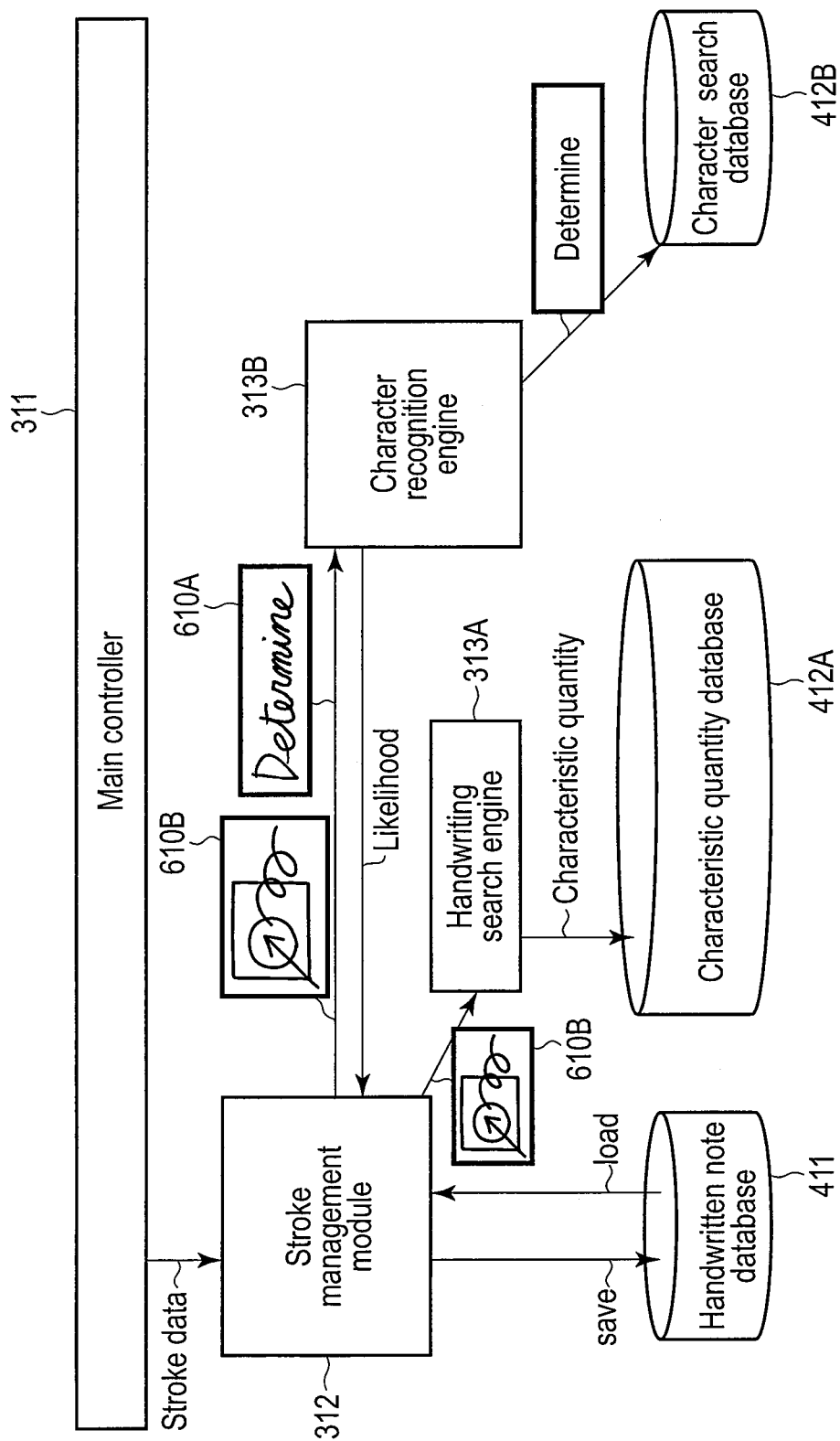
FIG. 17 is a diagram to describe an index generation operation executed by the electronic device in the embodiment.

FIG. 17 illustrates a process in which index information for searching the handwritten page 610 in FIG. 15 is generated. The main controller 311 sends a plurality of stroke data included in the handwritten page 610 to the character recognition engine 313B via the stroke management module 312 and requests the character recognition engine 313B to compute character string likelihood for each area in the handwritten page 610.

The character recognition engine 313B performs a structure analysis for the handwritten page 610 based on the plurality of stroke data included in the handwritten page 610. In the structure analysis processing, the character recognition engine 313B, for example, can group a plurality of stroke data and classify the plurality of stroke data into a plurality of areas (a plurality of handwritten blocks). In the grouping, the character recognition engine 313B can classify the plurality of stroke data into a plurality of handwritten blocks so that stroke data corresponding to strokes which are located close to each other are classified into the same block.

The handwritten page 610 in FIG. 15 is divided into two handwritten blocks (two areas) of the area 610A and the area 610B. The character recognition engine 313B computes for each handwritten block character string likelihood (character string likelihood score) indicating its resemblance to a character (resemblance to a character string).

Because the character string likelihood of the area 610B is low, a plurality of stroke data corresponding to a plurality of strokes included in the area 610B is sent to the handwriting search engine 313A. The handwriting search engine 313A extracts characteristic quantity for each of a plurality of strokes included in the area 610B and store the characteristic quantity in the characteristic quantity database 412A as the above-described characteristic quantity index information. To the area 610A which has high character string likelihood, character recognition is applied by the character recognition engine 313B and a stroke group in the area 610A is converted to code information (text) which includes one or more character code. This code information (character code group) is stored in the character string search database 412B as the above-described character string index information.

The character string likelihood computation is individually executed for all areas in each handwritten page. The character string likelihood computation is also executed for a plurality of strokes used as a search key.

Next, with reference to FIG. 18 and FIG. 19, the relation between a plurality of strokes input by handwriting to the search key input area 511 and the search method to be executed will be described.

Figure 18:
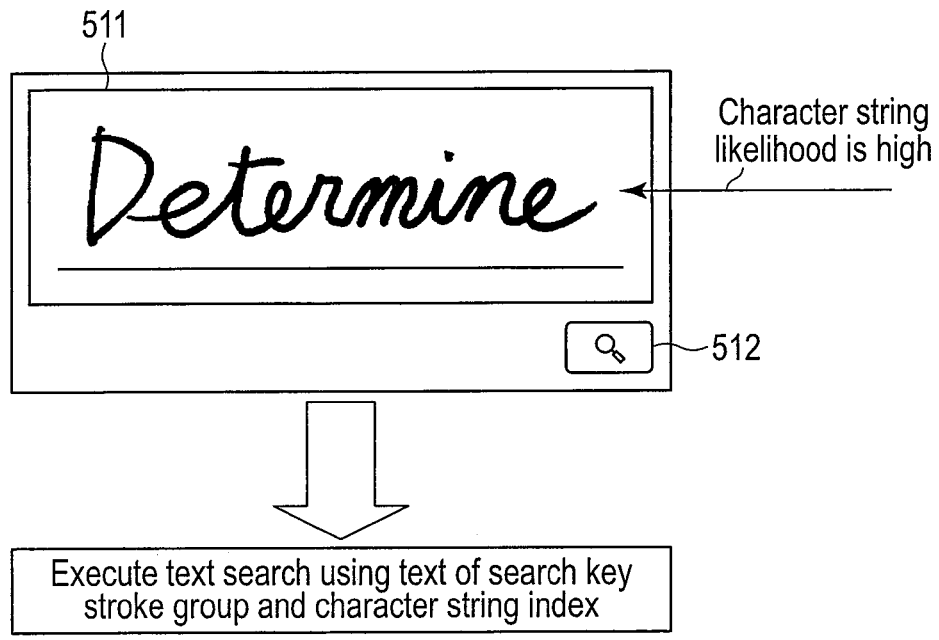
FIG. 18 is a diagram to describe a search method executed by the electronic device in the embodiment when a character string likelihood of a group of strokes corresponding to a search key is high.

In FIG. 18, a case in which a handwritten character string "Determine" is handwritten into the search key input area 511 as a search key is supposed. The search processing module 402, using the character recognition engine 313B, computes the character string likelihood of the handwritten character string "Determine". In this case, the whole stroke group corresponding to the handwritten character string "Determine" is treated as one area (one handwritten block) as described above in the character string likelihood computation. Because the stroke group has high character string likelihood, the search processing module 402 selects the character string search (text search). The search processing module 402 executes the character string search (text search) using code information (text) corresponding to the handwritten character string "Determine" and the above-described character string index information.

Figure 19:
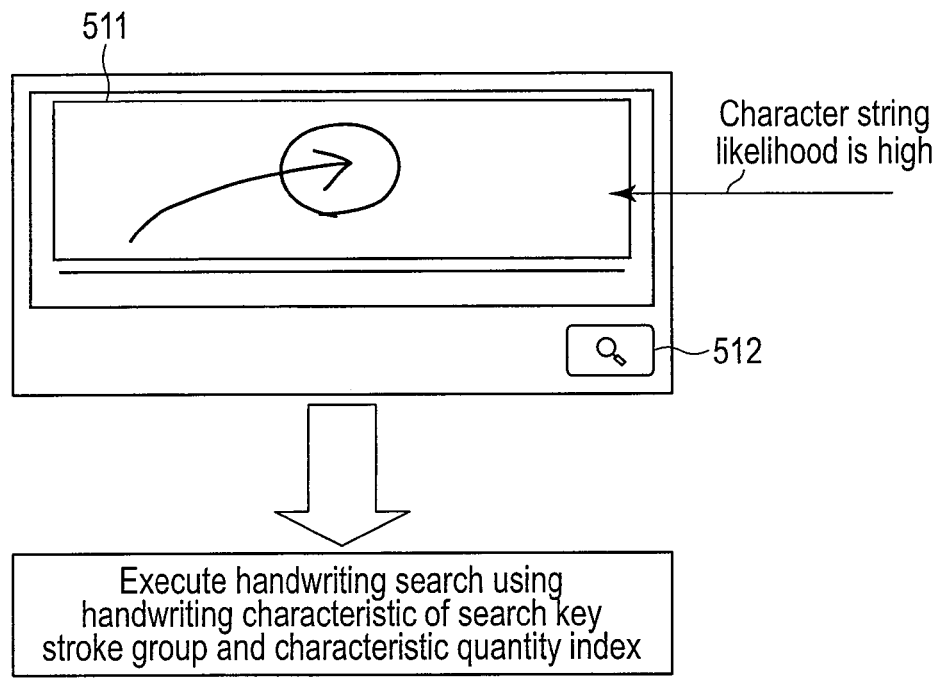
FIG. 19 is a diagram to describe a search method executed when the character string likelihood of the group of strokes corresponding to the search key is low.

In FIG. 19, a case in which a handwritten figure is written by hand into the search key input area 511 as a search key is supposed. In this case, the search processing module 402 treats the whole of the stroke group corresponding to the handwritten figure as one area (one handwritten block) as described above and computes the character string likelihood of the whole of the group of strokes using the character recognition engine 313B. Because the group of strokes has low character string likelihood, the search processing module 402 selects the handwriting search. The search processing module 402 executes the handwriting search using the characteristic quantity (handwriting characteristic) for the group of strokes of the handwritten figure and the above-described characteristic quantity index information.

If the character string likelihood for a plurality of strokes input to the search key input area 511 is within a middle range between high character string likelihood corresponding to a character and low character string likelihood corresponding to a non-character, the search processing module 402 may execute both the character string search which uses the code information of the character string corresponding to a plurality of strokes input to the search key input area 511 and the handwriting search which uses the characteristic quantity of a plurality of strokes input to the search key input area 511.

Although a case of using a stroke group handwritten in the search key input area 511 as a search key is shown in FIG. 18 and FIG. 19, a stroke group on the note view screen that is selected with the above-described range selection tool may also be used as a search key.

Next, a threshold for determining whether each area is the area with high character string likelihood (character string area) or the area with low character string likelihood (non-character string area) will be described below.

Though a threshold Th-1 for determining an area with high character string likelihood (character string area) and a threshold Th-2 for determining an area with low character string likelihood (non-character string area) can be set to the same value (the same character string likelihood score), the threshold Th-1 and the threshold Th-2 may be set to different character string likelihood scores as described in FIG. 20.

FIG. 20 illustrates a case in which the character string likelihood score of the threshold Th-1 is set to a value higher than the character string likelihood score of the threshold Th-2. The character string likelihood score of the threshold Th-1 may be 80. In this case, an area whose character string likelihood score is higher than 80 is determined to be a character string area. For the index information for searching each character string area in a handwritten page whose character string likelihood is higher than 80, the above-described character string index information is used.

The character string likelihood score of the threshold Th-2 may be 20. In this case, an area whose character string likelihood score is lower than 20 is determined to be a non-character string area. For the index information for searching each non-character string area in a handwritten page whose character string likelihood is lower than 20, the above-described characteristic quantity index information is used.

If the character string likelihood score of an area in a handwritten page is within a middle range between the threshold Th-1 and the threshold Th-2, the above-described characteristic quantity index information and the above-described character string index information are both generated and stored for the index information to search the area.

That is, the index generator 402A, depending on a plurality of character string likelihood scores for a plurality of areas in a plurality of handwritten pages, determines which area each of these areas is, (i) a character string area, (ii) a non-character string area, and (iii) an intermediate area between a character string area and a non-character string area. The index generator 402A then generates character string index information for searching each area that is determined to be an above-described character string area and character string index information for searching each area that is determined to be an above-described intermediate area. The index generator 402A further generates characteristic quantity index information, which is the characteristic quantity index information for searching each area determined to be an above-described non-character string area and indicates a characteristic quantity of strokes in each of the areas determined to be non-character string areas. The index generator 402A further generates characteristic quantity index information, which is the characteristic quantity index information for searching each area determined to be an above-described intermediate area and indicates a characteristic quantity of strokes in each of the areas determined to be intermediate areas.

As described above, in this embodiment, characteristic quantity index information and above-described character string index information are both generated and stored for an area (a group of strokes) that is difficult to be determined as a character string or an object other than a character string. In other words, an area difficult to be determined as a character string or an object other than a character becomes the target of search whichever search between the handwriting search and the text search is executed. Accordingly, a search having robustness becomes possible.

Though a single value may be used for the threshold of character string likelihood scores (threshold likelihood) used for the determination of the search method (the handwriting search or the text search), two distinct above-described thresholds Th-1 and Th-2 may be used for the determination of the search method to be executed. In this case, if the character string likelihood score of a group of strokes input as a search key is higher than the threshold (threshold likelihood) Th-1 (=80), the character string search (text search) is executed. If the character string likelihood score of a group of strokes input as a search key is lower than the threshold (threshold likelihood) Th-2 (=20), the handwriting search is executed. If the character string likelihood score of a group of strokes input as a search key is within a middle range between the threshold Th-1 and the threshold Th-2, both the handwriting search and the character string search (text search) are executed. In this case, both a handwritten page searched with the handwriting search and a handwritten page searched with the character string search may be presented to the user as search results corresponding to the search key.

FIG. 21 illustrates a search result screen 600 which is displayed by the handwriting note application program 202. A case in which a handwritten character string "TABLET" input to the search key input area 601 is used as a search key is supposed in FIG. 21. On the search result screen 600, thumbnails 601A each of which corresponds to one of some handwritten pages that contain the handwritten character string "TABLET" are displayed. That is, the thumbnails 601A corresponding to each of some handwritten documents containing a stroke group supposed to be the handwritten character string "TABLET" are displayed on the search screen 600. In FIG. 21, a case in which five handwritten pages are searched as handwritten documents containing the handwritten character string "TABLET" is shown. The hit word, that is, the handwritten character string "TABLET" in the five thumbnails 601A (that is, a stroke group corresponding to the handwritten character string "TABLET") is highlighted.

When the handwriting note application program 202 detects a gesture such as a tap gesture performed on a thumbnail 601A, the handwriting note application program 202 displays the handwritten page corresponding to the thumbnail 601A.

Figure 22:
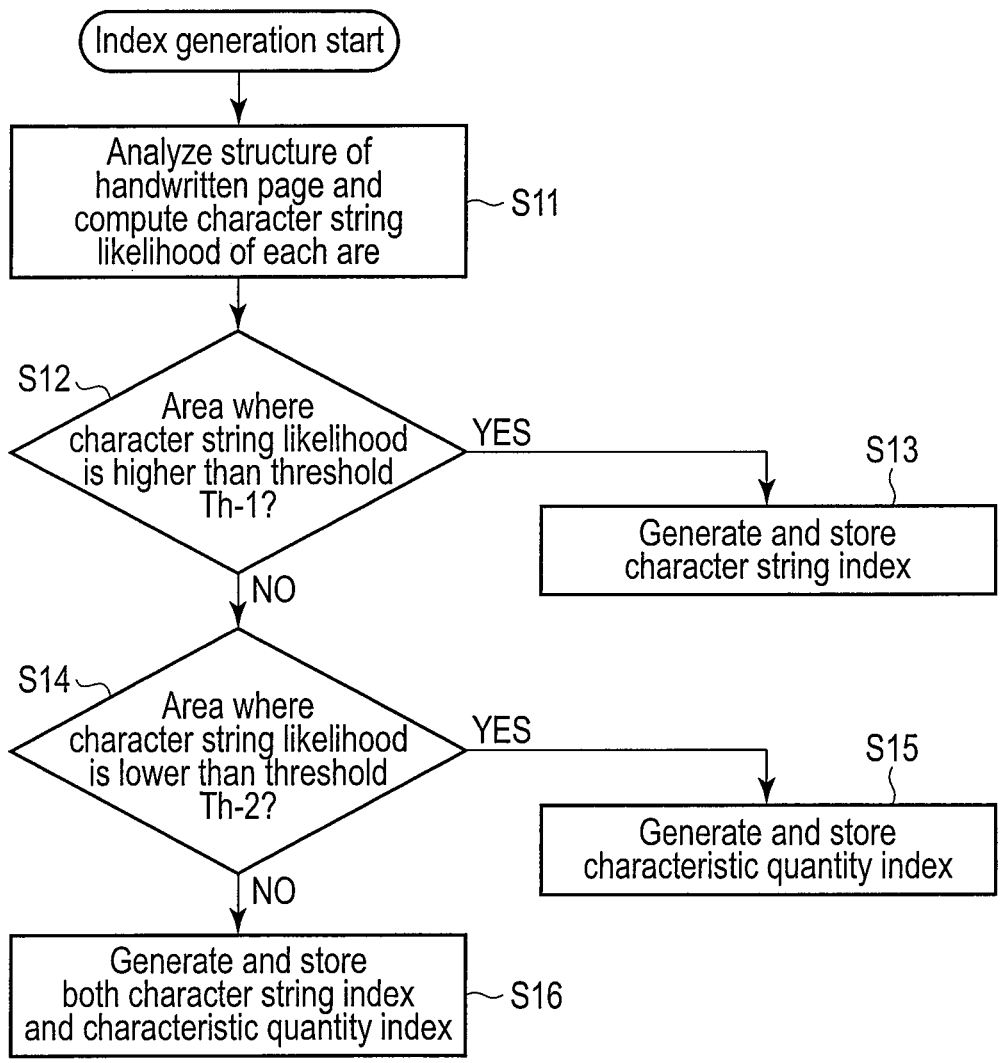
FIG. 22 is a flow chart showing a procedure for index generation processing performed by the electronic device in the embodiment.

FIG. 22 is a flowchart illustrating steps of the index generation processing that is executed by the handwriting note application program 202.

The index generator 402A, using the character recognition engine 313B, executes the structure analysis to the target handwritten page and thereby computes the character string likelihood of each area (each handwritten block) in the handwritten page (step S11). The index generator 402A determines whether or not the character string likelihood of the target area is higher than the above-described threshold Th-1 (step S12). If the character string likelihood of the target area is higher than the threshold Th-1 (step S12: YES), the index generator 402A generates character string index information for searching the target area with the text search method and stores the character string index information in the character string search database 412B (step S13). The character string index information includes code information of a character string corresponding to strokes in the target area.

If the character string likelihood of the target area is not higher than the above-described threshold Th-1 (step S12: NO), the index generator 402A determines whether or not the character string likelihood of the target area is lower than the above-described threshold Th-2 (step S14). If the character string likelihood of the target area is lower than the above-described threshold Th-2 (step S14: YES), the index generator 402A generates characteristic quantity index information for searching the target area with the handwriting search method and stores the characteristic quantity index information in the characteristic quantity database 412A (step S15). The characteristic quantity index information indicates the characteristic quantity (handwriting characteristic) of strokes in the target area.

If the character string likelihood of the target area is not lower than the above-described threshold Th-2, i.e. the character string likelihood is within a middle range between the threshold Th-1 and the threshold Th-2 (step S14: NO), the index generator 402A generates both of character string index information and characteristic quantity index information of the target area (step S16). In step S16, the index generator 402A stores the characteristic quantity index information of the target area in the characteristic quantity database 412A and stores the character string index information of the target area in the character string search database 412B.

Although, in the index generation processing shown in FIG. 22, the type of index information to be generated is automatically changed between the character string index information and the characteristic quantity index information according to the character string likelihood of each area (each handwritten block) in each handwritten page, it is possible that both of the character string index information and the characteristic quantity index information are generated for every area.

Figure 23:
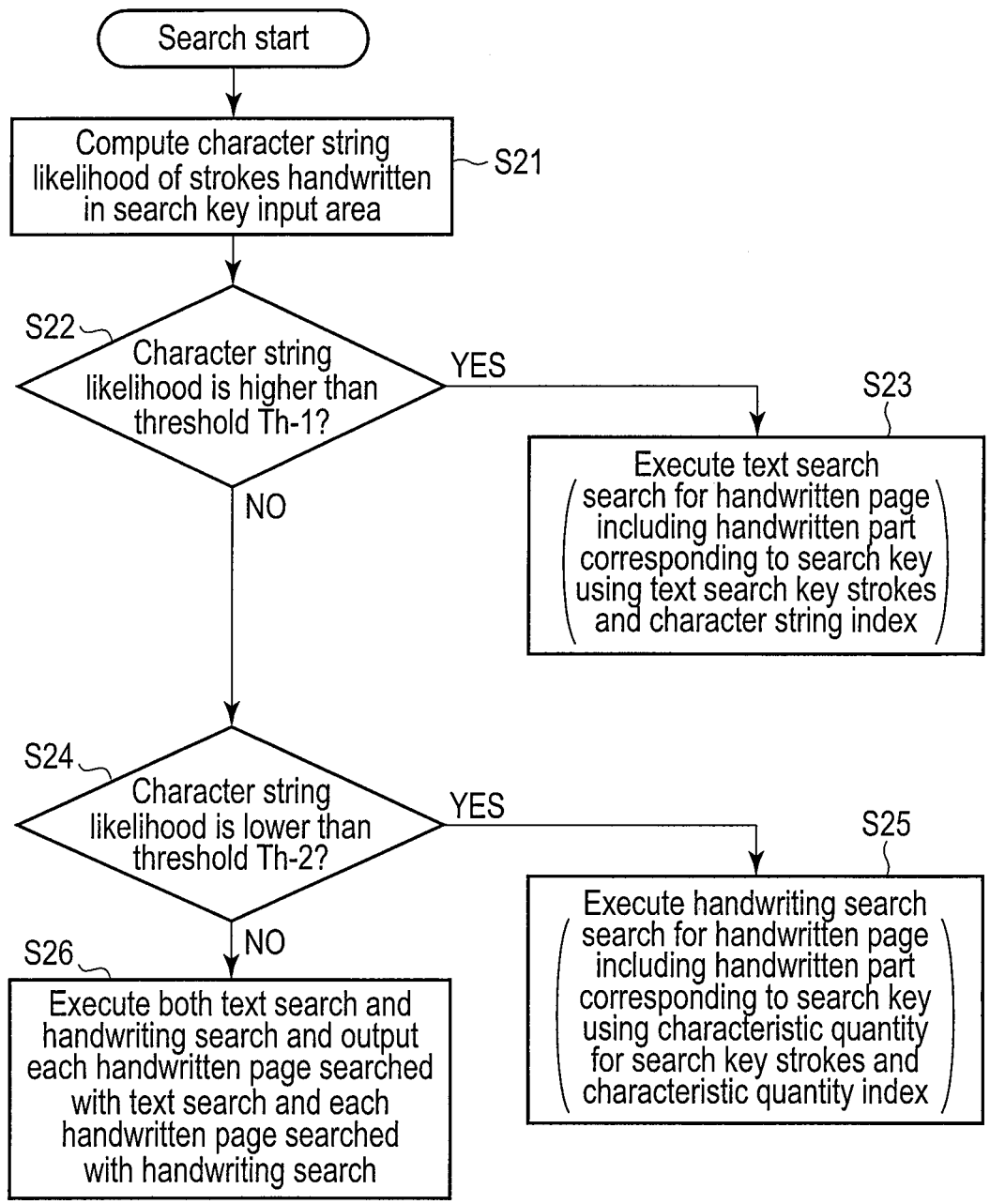
FIG. 23 is a flow chart showing a procedure for search processing performed by the electronic device in the embodiment.

FIG. 23 is a flowchart illustrating procedures of the handwritten document search processing that is executed by the handwriting note application program 202.

The search processing module 402, by treating all strokes handwritten in the search key input area as one handwritten block, computes the character string likelihood of this handwritten block (i.e. the character string likelihood of a plurality of strokes which is a search key) using the character recognition engine 313B (step S21). The search processing module 402 then determines whether or not the character string likelihood of the strokes which is the search key is higher than the above-described threshold Th-1 (step S22).

If the character string likelihood of the strokes which is the search key is higher than the above-described threshold Th-1 (step S22: YES), the search processing module 402 executes the character string search (text search) (step S23). In this search, the search processing module 402 executes the character string search using character string index information in the character string search database 412B and code information of the character string corresponding to the strokes which is the search key. The search processing module 402 searches for each handwritten page which contains the handwritten data section corresponding to the search key, i.e. each handwritten page containing the handwritten data section corresponding to the character string of the search key.

If the character string likelihood of the strokes which is the search key is not higher than the above-described threshold Th-1 (step S22: NO), the search processing module 402 determines whether or not the character string likelihood of the strokes which is the search key is lower than the above-described threshold Th-2 (step S24).

If the character string likelihood of the strokes which is the search key is lower than the above-described threshold Th-2 (step S24: YES), the search processing module 402 executes the handwriting search (step S25). In the search, the search processing module 402 executes the handwriting search using the characteristic quantity of the strokes which is the search key and characteristic quantity index information in the characteristic quantity database 412A. The search processing module 402 searches for each handwritten page which contains the handwritten data section corresponding to the search key, i.e. each handwritten page containing a plurality of strokes which resembles the plurality of strokes which is the search key.

If the character string likelihood of the strokes which is the search key is not lower than the above-described threshold Th-2 (step S24: NO), the search processing module executes both of the character string search (text search) and the handwriting search (step S26). In this process, the search processing module 402 outputs both of each handwritten page searched with the character string search (text search) and each handwritten page searched with the handwriting search as a search result corresponding to the above-described search key. In this case, the search processing module 402 may merge the search result from the character string search (text search) with the search result from the handwriting search in order to prevent duplicates of the same handwritten page from being displayed on the search result screen.

Though a case in which character string likelihood is classified to three levels by use of two thresholds is illustrated in the handwritten document search processing shown in FIG. 23, character string likelihood may be classified to two levels by use of one threshold.

As described above, in the embodiment, a plurality of handwritten documents which include a plurality of stroke data corresponding to a plurality of strokes are stored, and a first index information (character string index information) for searching a plurality of areas in the plurality of handwritten documents and a second index information (characteristic quantity index information) for searching a plurality of areas in the plurality of handwritten documents are generated. According to the character string likelihood of a plurality of first strokes which is a search key, the search method (the handwriting search or the character string search) to be executed is automatically determined. Accordingly, because the character string search is executed if the search key resembles a character string and the handwriting search is executed if the search key does not resemble any character string, precision of the handwritten documents search can be increased. Thus, handwritten documents including not only handwritten character strings but also non-character handwritten objects such as handwritten figures, handwritten tables, handwritten marks and the like can be searched efficiently.

In the embodiment, character string index information for searching a plurality of character string areas in a plurality of handwritten documents and characteristic quantity index information for searching a plurality of non-character string areas in the plurality of handwritten documents can also be generated. In this case, if a search key resembles a character string, a plurality of character string areas in a plurality of handwritten documents can be the search target, and if a group of strokes which resembles a handwritten object other than a character string is used as a search key, a plurality of non-character string areas in a plurality of handwritten documents can be the target of the handwriting search. As described above, in the embodiment, the character string search is applied to character string-like areas, and to the other areas, the handwriting search is applied. Therefore, precision in handwritten document search can be further increased.

Since various kinds of processing on a handwritten document according to the present embodiment can be realized by a computer program and thus, the same effect as that in the present embodiment can easily be realized only by installing the computer program through a computer readable storage medium storing the computer program.

All or any part of functions in the handwriting search unit 402, the index generator 402A, and the search engine 313 may be executed on the server 2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device, comprising:
   a storage module configured to store a plurality of handwritten documents in a storage medium, the handwritten documents including a plurality of stroke data corresponding to a plurality of strokes;
   a generator configured to generate first index information and second index information, the first index information including codes of character strings corresponding to strokes, the second index information including characteristic quantity of strokes; and
   a processor configured to execute at least either one of a first search and a second search, according to a character string likelihood of a plurality of first strokes which is a search key,
   wherein the first search is performed by using the second index information and characteristic quantity of the first strokes, and wherein the second search is performed by using the first index information and a code of a character string corresponding to the first strokes.

2. The electronic device of claim 1,
   wherein the first index information is information for searching a plurality of character string areas in the handwritten documents and includes a code of a character string corresponding to strokes in each character string area, and
   wherein the second index information is information for searching a plurality of non-character string areas in the handwritten documents and includes characteristic quantity of strokes in each non-character string area.

3. The electronic device of claim 2,
   wherein the generator is further configured to:
   determine, according to a plurality of character string likelihoods corresponding to a plurality of areas in the handwritten documents, which of a character string area, a non-character string area, and an intermediate area between the character string area and the non-character string area each of the plurality of areas is, and
   generate the first index information to search each area determined to be the character string area, the second index information to search each area determined to be the non-character string area, the first index information to search each area determined to be the intermediate area, and the second index information to search each area determined to be the intermediate area.

4. The electronic device of claim 1,
   wherein the processor is further configured to:
   execute the second search if the character string likelihood of the first strokes is higher than a first threshold likelihood;
   execute the first search if the character string likelihood of the first strokes is lower than a second threshold likelihood, wherein a second threshold likelihood is lower than the first threshold likelihood; and
   execute the second search and the first search if the character string likelihood of the first strokes is within a middle range between the first threshold likelihood and the second threshold likelihood.

5. The electronic device of claim 4,
   wherein the processor is further configured to output both of a handwritten document searched with the second search and a handwritten document searched with the first search as a search result corresponding to the search key, if the character string likelihood of the first strokes is within the middle range between the first threshold likelihood and the second threshold likelihood.

6. The electronic device of claim 1,
   wherein the first index information is obtained by applying character recognition to a plurality of strokes in the handwritten documents.

7. The electronic device of claim 1,
wherein the first strokes include strokes handwritten in a search key input area on a screen.

8. The electronic device of claim 1,
wherein the first strokes include strokes which are selected from a plurality of strokes in a handwritten document displayed on a screen.

9. A method of searching for handwritten document, comprising:
storing a plurality of handwritten documents in a storage medium, the handwritten documents including a plurality of stroke data corresponding to a plurality of strokes;
generating first index information and second index information, the first index information including codes of character strings corresponding to strokes, the second index information including characteristic quantity of strokes; and
executing at least either one of a first search and a second search, according to a character string likelihood of a plurality of first strokes which is a search key,
wherein the first search is performed by using the second index information and characteristic quantity of the first strokes, and wherein the second search is performed by using the first index information and a code of a character string corresponding to the first strokes.

10. The method of claim 9,
wherein the first index information is information for searching a plurality of character string areas in the handwritten documents and includes a code of a character string corresponding to strokes in each character string area, and
wherein the second index information is information for searching a plurality of non-character string areas in the handwritten documents and includes characteristic quantity of strokes in each non-character string area.

11. The method of claim 10, further comprising determining, according to a plurality of character string likelihoods corresponding to a plurality of areas in the handwritten documents, which of a character string area, a non-character string area, and an intermediate area between the character string area and the non-character string area each of the plurality of areas is, and
wherein the generating comprises generating the first index information to search each area determined to be the character string area, the second index information to search each area determined to be the non-character string area, the first index information to search each area determined to be the intermediate area, and the second index information to search each area determined to be the intermediate area.

12. The method of claim 9,
wherein the executing comprising:
executing the second search if the character string likelihood of the first strokes is higher than a first threshold likelihood;
executing the first search if the character string likelihood of the first strokes is lower than a second threshold likelihood, wherein a second threshold likelihood is lower than the first threshold likelihood; and
executing the second search and the first search if the character string likelihood of the first strokes is within a middle range between the first threshold likelihood and the second threshold likelihood.

13. The method of claim 12, further comprising outputting both of a handwritten document searched with the second search and a handwritten document searched with the first search as a search result corresponding to the search key, if the character string likelihood of the first strokes is within the middle range between the first threshold likelihood and the second threshold likelihood.

14. The method of claim 9,
wherein the first index information is obtained by applying character recognition to a plurality of strokes in the handwritten documents.

15. The method of claim 9,
wherein the first strokes include strokes handwritten in a search key input area on a screen.

16. The method of claim 9,
wherein the first strokes include strokes which are selected from a plurality of strokes in a handwritten document displayed on a screen.

17. A computer-readable, non-transitory storage medium having stored thereon a computer program which is executable by a computer, the computer program controlling the computer to execute functions of:
storing a plurality of handwritten documents in a storage medium, the handwritten documents including a plurality of stroke data corresponding to a plurality of strokes;
generating first index information and second index information, the first index information including codes of character strings corresponding to strokes, the second index information including characteristic quantity of strokes; and
executing at least either one of a first search and a second search, according to a character string likelihood of a plurality of first strokes which is a search key,
wherein the first search is performed by using the second index information and characteristic quantity of the first strokes, and wherein the second search is performed by using the first index information and a code of a character string corresponding to the first strokes.

18. The storage medium of claim 17,
wherein the first index information is information for searching a plurality of character string areas in the handwritten documents and includes a code of a character string corresponding to strokes in each character string area, and
wherein the second index information is information for searching a plurality of non-character string areas in the handwritten documents and includes characteristic quantity of strokes in each non-character string area.

19. The storage medium of claim 18,
wherein the computer program further controls the computer to execute a function of determining, according to a plurality of character string likelihoods corresponding to a plurality of areas in the handwritten documents, which of a character string area, a non-character string area, and an intermediate area between the character string area and the non-character string area each of the plurality of areas is, and
wherein the generating comprises generating the first index information to search each area determined to be the character string area, the second index information to search each area determined to be the non-character string area, the first index information to search each area determined to be the intermediate area, and the second index information to search each area determined to be the intermediate area.

20. The storage medium of claim 17,
wherein the executing comprising:
executing the second search if the character string likelihood of the first strokes is higher than a first threshold likelihood;

executing the first search if the character string likelihood of the first strokes is lower than a second threshold likelihood, wherein a second threshold likelihood is lower than the first threshold likelihood; and executing the second search and the first search if the character string likelihood of the first strokes is within a middle range between the first threshold likelihood and the second threshold likelihood.

21. The storage medium of claim 20,
wherein the computer program further controls the computer to execute a function of outputting both of a handwritten document searched with the second search and a handwritten document searched with the first search as a search result corresponding to the search key, if the character string likelihood of the first strokes is within the middle range between the first threshold likelihood and the second threshold likelihood.

22. The storage medium of claim 17,
wherein the first index information is obtained by applying character recognition to a plurality of strokes in the handwritten documents.

23. The storage medium of claim 17,
wherein the first strokes include strokes handwritten in a search key input area on a screen.

24. The storage medium of claim 17,
wherein the first strokes include strokes which are selected from a plurality of strokes in a handwritten document displayed on a screen.

* * * * *